(12) United States Patent
Park et al.

(10) Patent No.: US 9,258,037 B2
(45) Date of Patent: Feb. 9, 2016

(54) METHOD OF MANAGING MOBILITY USING COORDINATED MULTIPLE POINT COMMUNICATION

(75) Inventors: SoonGi Park, Daejeon (KR); Byung-Han Ryu, Daejeon (KR); Nam Hoon Park, Daejeon (KR); Jun Sik Kim, Seoul (KR); Sang Chul Oh, Daejeon (KR); Hong Soog Kim, Daejeon (KR); Kyung Sook Kim, Daejeon (KR); Young Jick Bahg, Daejeon (KR); Sung Gu Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 458 days.

(21) Appl. No.: 13/613,570

(22) Filed: Sep. 13, 2012

(65) Prior Publication Data

US 2013/0157712 A1    Jun. 20, 2013

(30) Foreign Application Priority Data

Dec. 15, 2011   (KR) .......................... 10-2011-0135216

(51) Int. Cl.
*H04W 36/00* (2009.01)
*H04B 7/02* (2006.01)
*H04W 36/18* (2009.01)

(52) U.S. Cl.
CPC ............... *H04B 7/024* (2013.01); *H04W 36/18* (2013.01)

(58) Field of Classification Search
USPC ..................... 455/436–456.6; 370/315–320
See application file for complete search history.

(56) References Cited

U.S. PATENT DOCUMENTS

| | | | |
|---|---|---|---|
| 8,804,593 B2 * | 8/2014 | Etemad et al. | 370/312 |
| 2010/0173660 A1 | 7/2010 | Liu et al. | |
| 2012/0082082 A1 * | 4/2012 | Etemad et al. | 370/312 |
| 2012/0135771 A1 * | 5/2012 | Futaki | 455/509 |
| 2013/0343331 A1 * | 12/2013 | Ode et al. | 370/329 |

FOREIGN PATENT DOCUMENTS

KR    1020110100629    9/2011
WO    WO 2011016560 A1 *  2/2011

* cited by examiner

*Primary Examiner* — Fayyaz Alam
(74) *Attorney, Agent, or Firm* — Nelson Mullins Riley & Scarborough LLP; Anthony A. Laurentano; Lewis Lee

(57) ABSTRACT

Provided is a method of managing mobility of a user equipment. The method includes: establishing by a first base station a communication with the user equipment; transmitting by the first base station a Coordinated Multiple Point (CoMP) addition request to a second base station; establishing by the first and second base stations a CoMP communication with the user equipment according to the CoMP addition request; transmitting by the first base station an anchor cell change request to the second base station; and operating the second base station as an anchor cell of the CoMP communication according to the anchor cell switch request.

16 Claims, 37 Drawing Sheets

Fig. 3

| TYPE | CLASS | FEATURE |
|---|---|---|
| JP (Joint Processing) | JT (Joint Reception) | - With resect to time-resource resource, DL data for UE are effective in at least two point of coMP coordination set<br>- Data transmission is provided at the same time in at least two points (some or all of CoMP coordination set) for one UE or several UEs in time frequency resource<br>- Increase downlink signal quality received in UE (i.e., increase UE's downlink data throughput) |
| | DPS (Dynamic Point Selection) | - With resect to time-resource resource, DL data for UE are effective in at least two point of coMP coordination set<br>- Data communication is provided only in one point of coMP coordincation set in time-frequency resource<br>- Transmission and non-transmission points may be changed in a basis of one sub frame in CoMP coordination set |
| CS/CB (Coordinated Scheduling/ Coordinated Beamforming) | | - Data are effective in only one point of coMP coordincation set with respect to time-frequency resource and are transmitted from the one point<br>- Control downlink communications with other UE causing interference on downlink communication with interesting UE in viewpoints of decreasing interference by transmitting |

Fig. 4

| TYPE | CLASS | FEATURE |
|---|---|---|
| JP (Joint Processing) | JR (Joint Reception) | - With respect to time-frequency resource, data reception is performed simultaneously in at least two seperate points (some or all of coMP coordination set) in CoMP coordination set<br>- Several points simultaneously receive data that one UE transmits. Effective points are selected and signals received in the selected points are combined, thereby increasing quality of UL(i.e., throughput of UL of UE) |
| | DPS (Dynamic Point Selection) | - With respect to time-frequency resource, only one point of coMP coordination set receives data<br>- Transmission and non-transmission points may be changed in a basis of one sub frame in CoMP coordination set |
| CS/CB (Coordinated Scheduling/ Coordinated Beamforming) | | - One point of CoMP coordination set receives data with respect to time-frequency resource<br>- Control in a viewpoint of uplink point and time slot for receiving data from UE, which is not interested and cause interference to uplink of interesting UE<br>- Control to decrease interference by coordinating power and beamforming coefficients (PMI, Precoding matrix index) with viewpoint of common SNR |

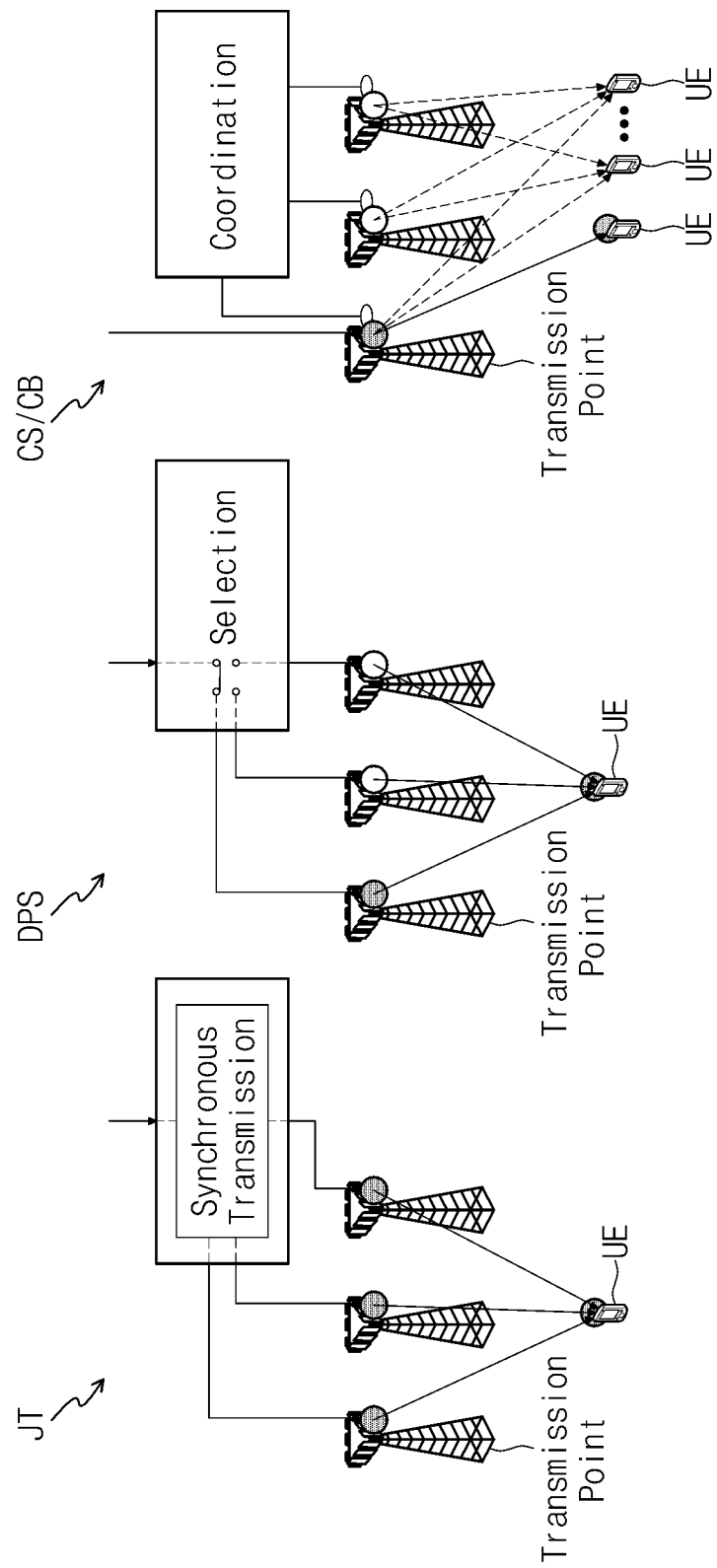

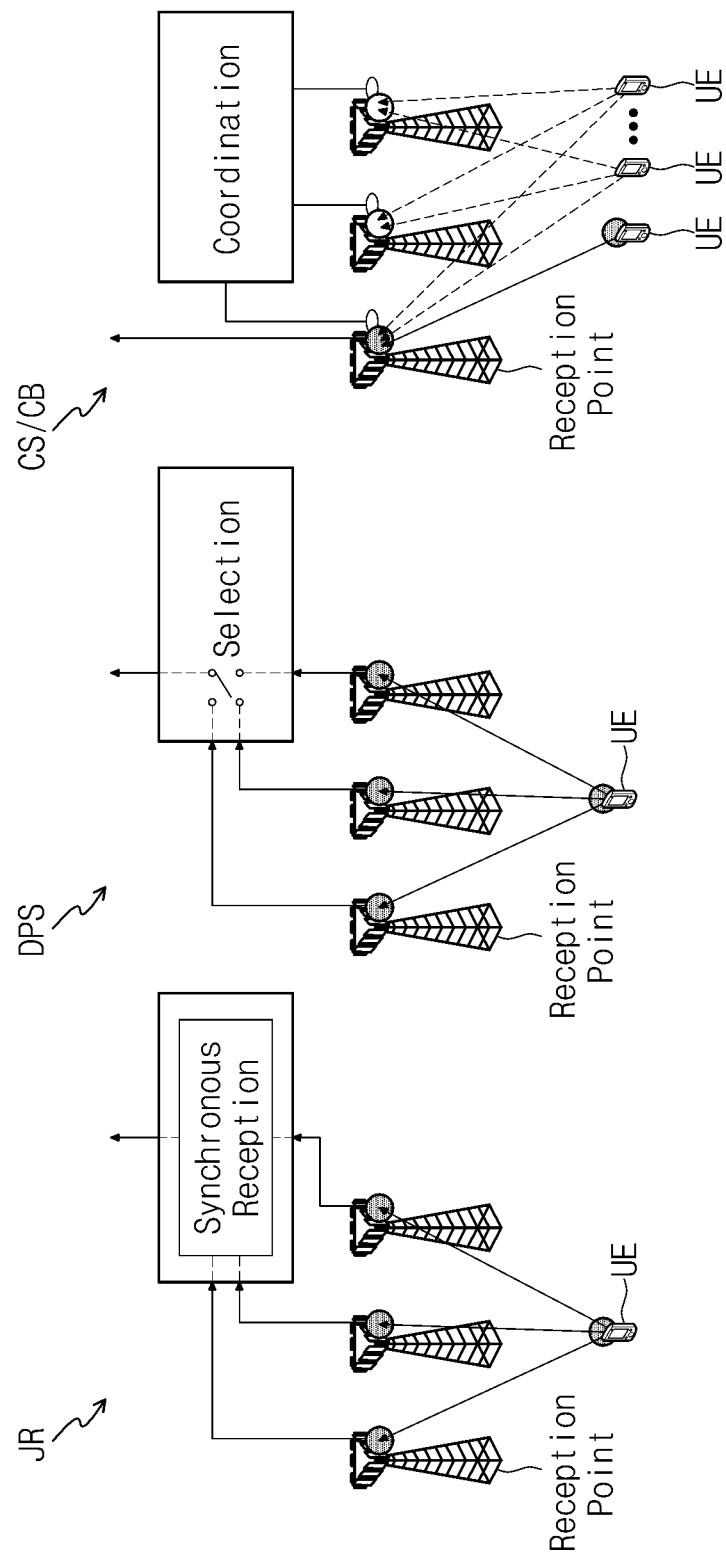

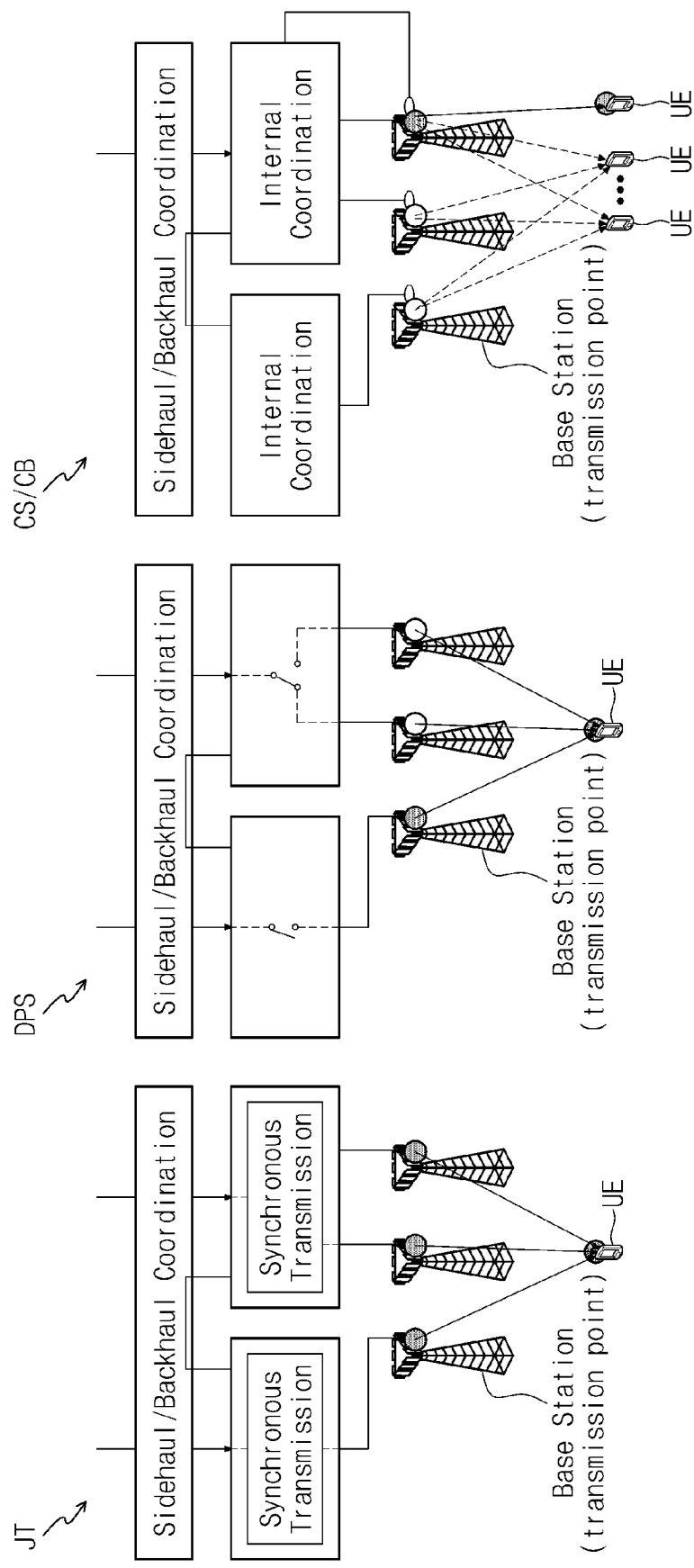

- Example of UL CoMP communication between BSs or CBSs or BS and CBS

METHOD OF MANAGING MOBILITY USING COORDINATED MULTIPLE POINT COMMUNICATION

CROSS-REFERENCE TO RELATED APPLICATIONS

This U.S. non-provisional patent application claims priority under 35 U.S.C. §119 of Korean Patent Application No. 10-2011-0135216, filed on Dec. 15, 2011, the entire contents of which are hereby incorporated by reference.

BACKGROUND OF THE INVENTION

The present invention disclosed herein relates to wireless communication, and more particularly, to a method of managing mobility using coordinated multiple point communication.

A wireless mobile network provides seamless wireless communication services to portable wireless communication terminals. The wireless mobile network includes a plurality of base stations (BSs).

Each BS manages one cell. A BS performs wireless communication with wireless communication terminals in a responsible cell. When a wireless communication terminal moves from one source cell to another cell (i.e., a target cell), the BS of the target cell establishes communication with the wireless communication terminal, and the BS of the source cell terminates communication with the wireless communication terminal. This operation is called Handover (HO). By the HO, a wireless mobile network provides seamless wireless communication services to a wireless communication terminal.

As a commercialized wireless mobile network, there are Global System for Mobile communication (GSM), Code Division Multiple Access (CDMA), Wideband CDMA (WCDMA), CDMA 2000, and World interoperability for Microwave Access (WiMAX), and Long Term Evolution.

SUMMARY OF THE INVENTION

A current mobile communication mechanism is based on hard handover. Typical hard handover conflicts with Coordinated Multiple Point (CoMP) communication, so that it may not be applied to the typical hard handover.

The present invention provides a method of managing mobility using the CoMP communication, in more detail, a handover method having the CoMP communication applied.

Embodiments of the present invention provide a method of managing mobility of a user equipment, the method including: establishing by a first base station a communication with the user equipment; transmitting by the first base station a Coordinated Multiple Point (CoMP) addition request to a second base station; establishing by the first and second base stations a CoMP communication with the user equipment according to the CoMP addition request; transmitting by the first base station an anchor cell change request to the second base station; and operating the second base station as an anchor cell of the CoMP communication according to the anchor cell switch request.

In some embodiments, the anchor cell switch request may be transmitted through a sidehaul or backhaul communication.

In other embodiments, the CoMP addition request may be transmitted through a sidehaul or backhaul communication.

In still other embodiments, the CoMP addition request may include information on an activation time that the second base station starts the CoMP communication to the user equipment.

In even other embodiments, the second base station may start the CoMP communication to the user equipment at the activation time.

In yet other embodiments, the second base station may request a parent server to add it to a data transmission path that communicates with the user equipment.

In further embodiments, the first base station may forward downlink data that are to be transmitted to the user equipment to the second base station.

In still further embodiments, when the first and second base stations provide the CoMP communication to the user equipment, retransmitting error data may be performed only by an anchor cell.

In even further embodiments, the method may further include requesting by the second base station a parent server to switch a data transmission path to the second base station.

In yet further embodiments, the method may further include: transmitting by the second base station a CoMP communication deletion request to the first base station; and disconnecting with the user equipment by the first base station in response to the CoMP communication deletion request.

In much further embodiment, the method may further include requesting by the first base station to a parent server to delete the first station from a data transmission path communicated with the user equipment.

In still much further embodiment, the CoMP addition request may be transmitted to the second base station according to a signal intensity of the first base station.

In even much further embodiment, the CoMP addition request may be transmitted to the second base station according to a signal intensity of the second base station.

In yet much further embodiment, the anchor cell switch request may be transmitted to the second base station according to signal intensities of the first and second base stations.

In yet much further embodiment, when a third base station is added to the CoMP communication, the anchor cell may notify the user equipment and the first base station that a third base station is added, and may transmit information on the first and second base stations to the third base station.

In yet much further embodiment, the anchor cell may transmit information on which cell is an anchor cell to the third base station.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 3 is a table illustrating types of the CoMP;

FIG. 4 is a table illustrating types of UL CoMP;

FIGS. 6A and 6B are views illustrating the DL and UL communication of CoMP communication in a BS or a CBS;

FIGS. 7A and 7B are views illustrating the DL and UL communication of a CoMP communication between BSs or CBSs or BS and CBS;

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
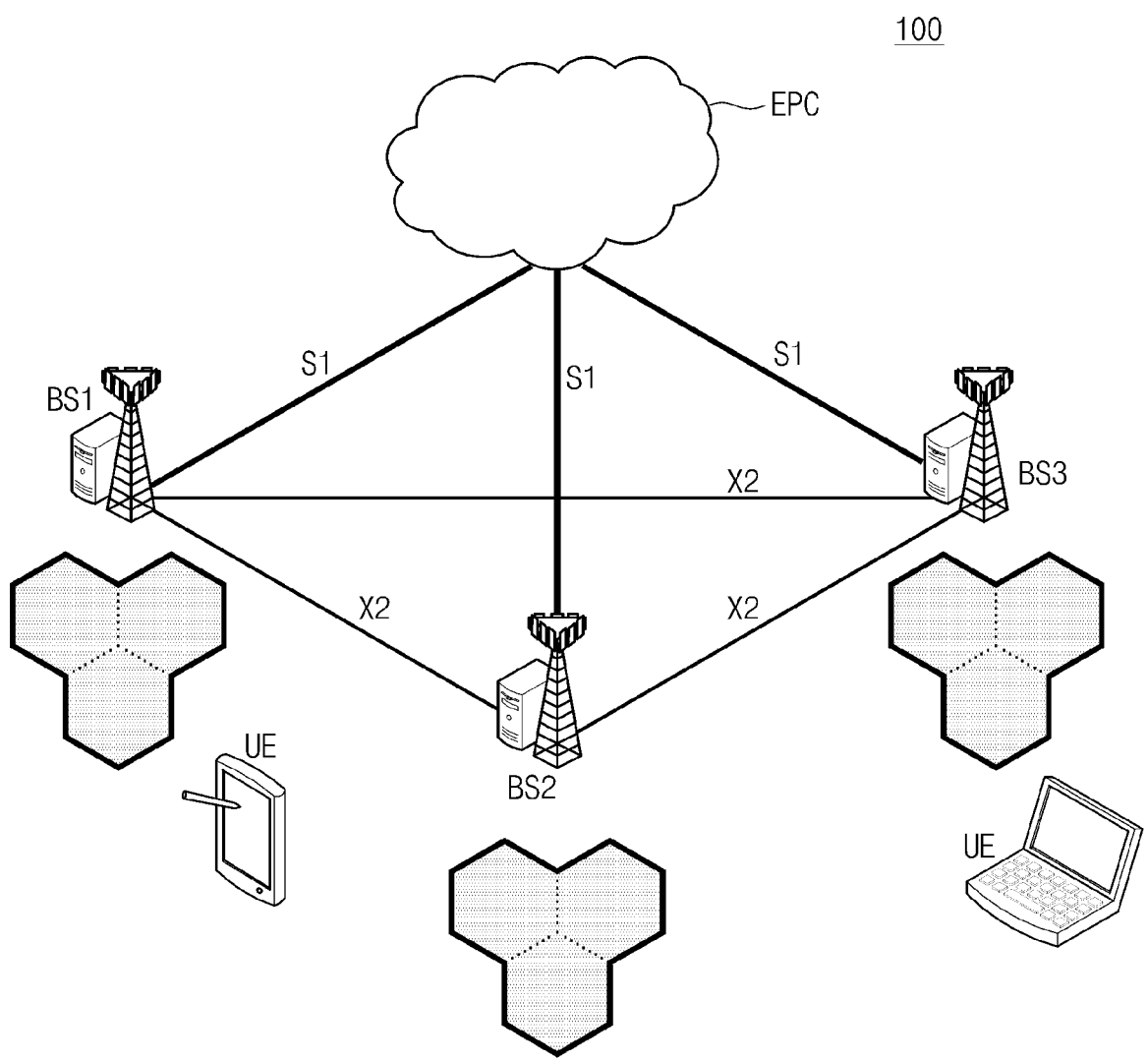
FIG. 1 is a view illustrating a wireless communication network.

FIG. 1 is a view illustrating a wireless communication network 100. Referring to FIG. 1, the wireless communication network 100 includes an Evolved Packet Core (EPC) and base stations (BS1 to BS3). The base stations BS1 to BS3 may include evolved Node Bs (eNBs).

The EPC is configured to control a wireless communication network 100, that is, communication between the wireless communication network 100 and a user equipment (UE). The EPC may include a Mobility Management Entity (MME) and a gateway.

Each BS may perform wireless transmission/reception with a UE. Each BS may form at least one cell. When one BS forms a plurality of cells, the cells may be sectors.

The BS1 to BS3 may communicate with the EPC through an S1 interface. The BS1 to BS3 may communication with each other through an X2 interface. The BS1 to BS3 may support handover between the BS1 to BS3 or between the sectors.

Figure 2:
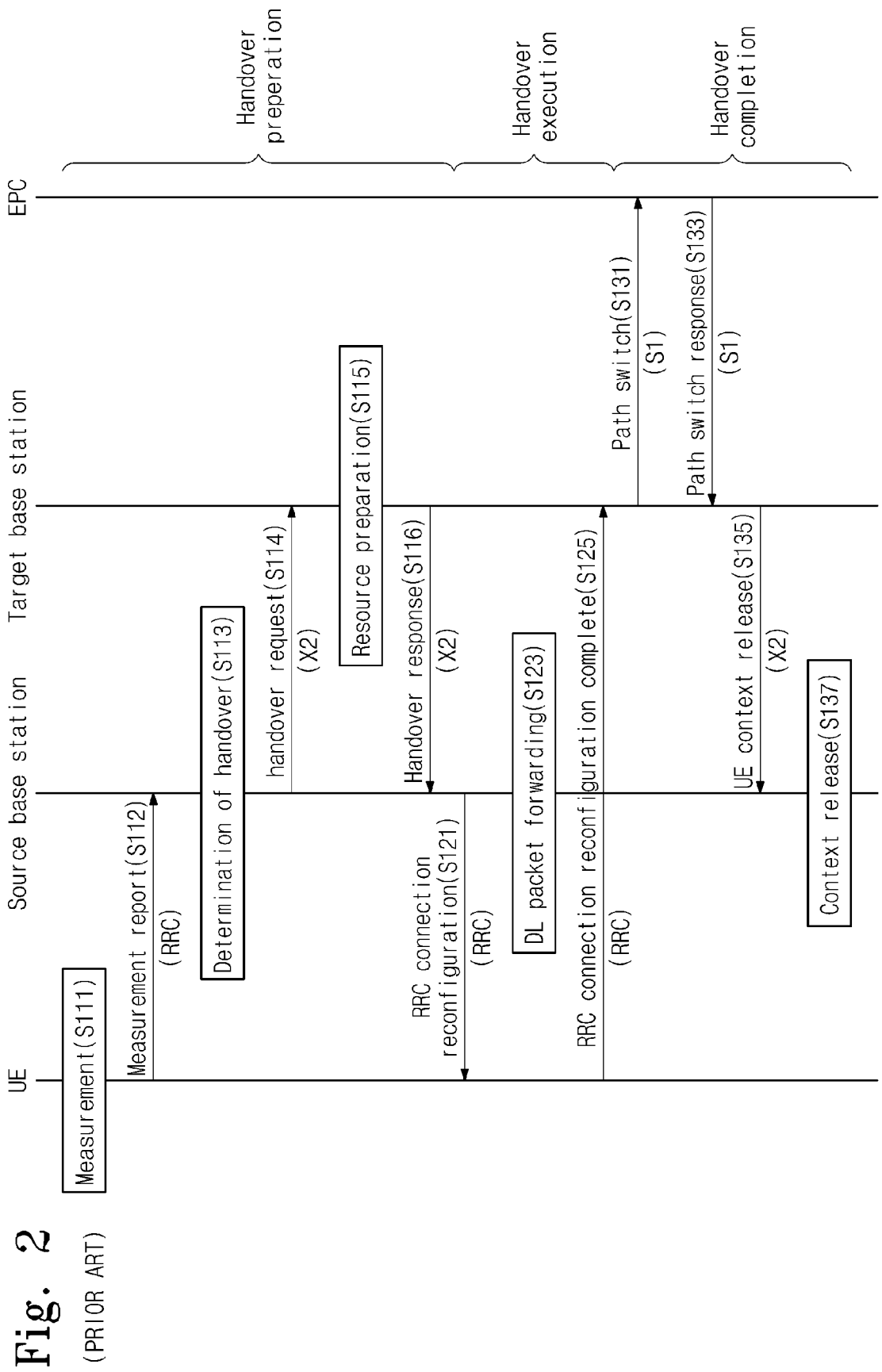
FIG. 2 is a flowchart illustrating a typical handover method performed in the wireless communication network of FIG. 1.

FIG. 2 is a flowchart illustrating a typical handover method performed in the wireless communication network 100 of FIG. 1. Referring to FIGS. 1 and 2, the handover is performed in order of handover preparation, handover execution, and handover completion.

The handover preparation is performed through operations S111 to S116. In operation S111, a UE performs a measurement operation. The UE may receive signals from a source BS that it belongs or the BSs of adjacent cells. In operation S112, the UE transmits a measurement report message to the source BS. The measurement report message may be transmitted through a Radio Resource Control (RRC) interface.

In operation 5113, the BS performs handover determination. On the basis of the measurement report message, the BS determines whether to perform handover of a UE, or determines which BS among the BSs of adjacent cells is used for a target BS in order to perform handover.

In operation 5114, the source BS transmits a handover request message to the target BS. The handover request message may be transmitted through the X2 interface. In operation 5115, the target BS performs a resource preparation operation in response to the handover request message. The target BS may prepare a wireless resource that is to be allocated to a UE that is handed over. In operation S116, the target BS transmits a handover Ack message to the source BS. The handover Ack message may be transmitted through the X2 interface.

The performing of the handover is completed through operations S121 to S125. In operation S121, the source BS transmits a RRC connection reconfiguration message to the UE. The RRC connection reconfiguration message may be transmitted through the RRC interface. The UE may reconfigure RRC connection from the source BS to the target BS in response to the RRC connection reconfiguration message.

In operation S123, the source BS performs a DownLink (DL) packet forwarding operation. In operation S125, the UE transmits an RRC connection reconfiguration complete message to the target BS. The RRC connection reconfiguration complete message may be transmitted through the RRC interface.

The handover is completed through operations S131 to S137. In operation S131, the target BS transmits a path switch message to the EPC. The path switch message may be transmitted through the S1 interface. In response to the path switch message, the EPC may switch a DL packet transmitting and UpLink (UL) packet receiving path from the source BS to the target BS. In operation S133, the EPC transmits a patch switch Ack message to the target BS. The path switch Ack message may be transmitted through the S1 interface.

In operation S135, the target BS transmits a UE context release message to the source BS. The UE context release message may be transmitted through the X2 interface. In operation S137, the source BS performs a context release operation. The source BS may delete a record on a UE that is handed over.

FIG. 2 illustrates a conventional handover process between cells belonging to different BSs. Some of the processes such as the X2 or S1 communication processes except the RRC communication processes may be skipped or replaced with similar internal processes according to implemented features or implementing methods.

When a handover operation is performed, a UL communication is disconnected in operations S121 to S125. Additionally, in operations S121 to S133, the DL communication is disconnected. In order to provide seamless communication to the UE at a cell edge and improve Quality of Service (QoS), Coordinated Multiple point (CoMP) communication is required.

The CoMP communication is a communication technique through which one UE performs communication with a plurality of points. A point may mean an antenna of a transmission side or a reception side. The CoMP may include SU- MIMO (single-user multiple input multiple output) and MU-MIMO (multi-user MIMO). The CoMP may require at least two geographically separated points for cooperated transmission and reception.

FIG. 3 is a table illustrating types of DL CoMP. Referring to FIG. 3, a DL CoMP is classified into a Joint Processing (JP) type and a Coordinated Scheduling (CS) or Coordinated Beamforming (CB) type.

The JP type is classified into a Joint Transmission (JT) class and a Dynamic Point Selection (DPS) class. In relation to a JP type JT class CoMP communication, DL data for UE are effective in at least two separated points of a CoMP coordination set (i.e., points for CoMP communication) with respect to a time-frequency resource, and data transmission is performed simultaneously in at least two points (i.e., some or all of the CoMP coordination set) with respect to one UE or a plurality of UEs. That is, according to a JP type JT class CoMP communication technique, a UE may receive effective DL packets from a plurality of points. The JP type JT class CoMP communication may increase the quality of signals received by a UE.

In relation to a JP type DPS class CoMP communication, DL data for UE are effective in at least two points of a CoMP coordination set with respect to a time-frequency resource, and data transmission is performed in only one point in the CoMP coordination set. A UE may select a point having the most excellent transmission performance in the CoMP coordination set, and may receive DL packets from the selected point. A setting change of a point for transmission or non-transmission may be coordinated by one sub frame unit. Determining a transmission point may be made according to Semi-static point selection (SSPS). Also, a non-transmission point may be determined according to the SSPS.

In relation to a CS/CB type CoMP communication, data are effective only in one point in the CoMP coordination set with respect to a time-frequency resource, and data are transmitted from only the one point. An effective point may be coordinated by scheduling or beamforming of the CoMP coordination set.

For example, the CoMP communication may be implemented in a mixed form of the JP type and the CS/CB type. For example, data are effective in a subset (i.e., at least one point) of the CoMP coordination set with respect to a time-frequency resource, and scheduling or beamforming are provided through coordination between CoMP subsets. That is, an effective subset in the CoMP coordination set transmits data through the JP type, or another subset transmits data through the CS/CB type.

FIG. 4 is a table illustrating types of UL CoMP. Referring to FIG. 4, the UL CoMP is classified into a JP type and a CS/CB type.

The JP type is classified into a Joint Reception (JR) class and a DPS class. In relation to a JP type JR class CoMP communication, UL data are simultaneously received by at least two points among a CoMP coordination set (i.e., points for CoMP communication) with respect to a time-frequency resource. When the UL data received by a plurality of points are combined, the quality of UL signals and/or the amount of data to be processed may be improved.

In relation to a JP type DPS class CoMP communication, one point having the most excellent receiving performance in the CoMP coordination set receives UL data with respect to a time-frequency resource. The setting of a reception and non-reception point may be coordinated by one sub frame unit. Determining a reception point may be made according to the SSPS.

In relation to a CS/CB type CoMP communication, only one point in the CoMP coordination set receives data with respect to a time-frequency resource, and a point that receives the data may be coordinated by scheduling or beamforming in the CoMP coordination set.

For example, the CoMP communication may be established in a mixed form of the JP type and the CS/CB type. For example, a reception point is coordinated with the CS/CB type in a subset (i.e., at least one point) of the CoMP coordination set. Also, the subset of the CoMP coordination set may receive JP type data.

For example, in the DL CoMP communication of FIG. 3, the DSP may be classified according to whether data are effective or not until a transmission point, i.e., according to the extent that a transmission point is changeable by a sub frame unit just before the data arrive at a transmission point of a BS. In the UL CoMP communication of FIG. 4, when data that the UE transmits are received, the DPS may be classified according to whether a point that receives and processes the data is changeable by a sub frame unit. In that the CS has a determined UL or DL transmission point and performs a coordination to improve the quality of a current transmitting or receiving point through a coordination between a transmission/reception point and other transmission/reception points, it may be different from the DPS. In the CS, the change of a transmission/reception point may be performed according to a typical handover procedure.

Figure 5:
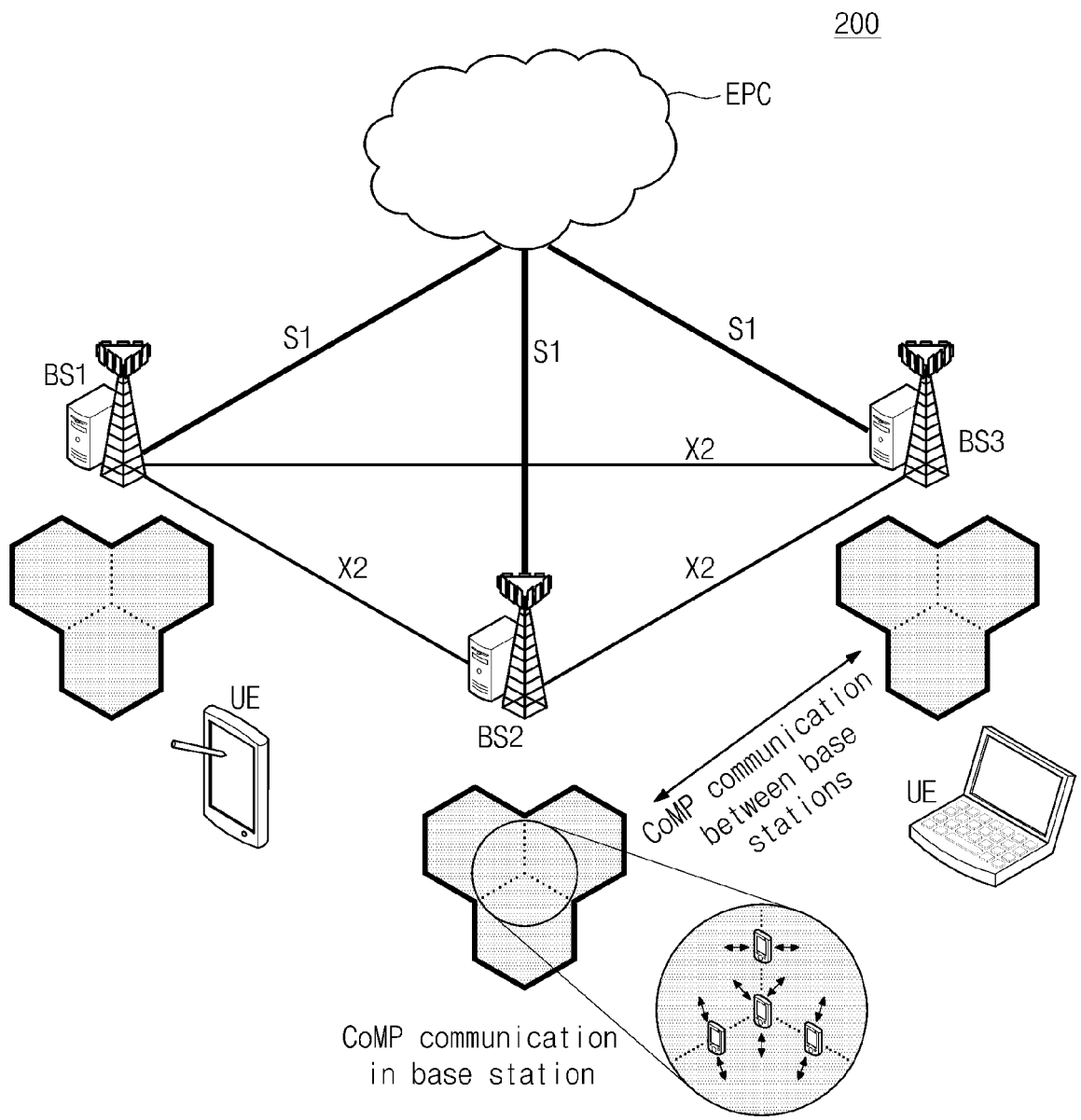
FIG. 5 is a view illustrating a wireless communication network having a CoMP applied.

FIG. 5 is a view illustrating a wireless communication network 200 having a CoMP applied. In an example, FIG. 5 illustrates conventional BSs in which the CoMP is applied. Compared to the wireless communication network 100 of FIG. 1, CoMP communication in a BS2 and CoMP communication between BS1 and BS2 are shown.

The CoMP communication in the BS2 may be a CoMP communication performed between sectors in the BS2. Since the CoMP communication in the BS2 is processed through an internal interface of the BS2, information exchange for performing the CoMP communication may be correctly processed, for example, in real time.

The CoMP communication between the BS1 and BS2 may be CoMP communication established between cells of different BS1 and BS2. In relation to the CoMP communication between the BS1 and BS2, information for performing CoMP communication is exchanged through a sidehaul interface such as the X2 interface or a backhaul interface such as the 51 interface. Therefore, in that the CoMP communication between the BS1 and BS2 cannot exchange necessary information between the BS1 and BS2 in real time, it is hard to adopt the JT class or the JR class.

FIGS. 6A and 6B are views illustrating the DL and UL communication of CoMP communication within a BS or a CBS. Referring to FIGS. 3, 4, 6A, and 6B, one backhaul traffic is transmitted through synchronous transmission, which is synchronized by a plurality of transmission points in the DL communication of a CoMP communication in a BS, for example, the JP type JT class communication. In a JP type DPS class communication, the backhaul traffic is transmitted through one selected from a plurality of transmission points. Determining a transmission point is made by a sub frame unit. In a CS/CB type communication, while it is determined that the backhaul traffic is transmitted to which transmission point among a plurality of transmission points, the backhaul traffic is transmitted through coordinated scheduling/beamforming between a corresponding transmission point and a plurality of other transmission points.

In the UL communication of a CoMP communication in a BS, for example, a JP type JR class communication, a plurality of reception points receive data transmitted from a UE through synchronous reception. In a JP type DPS class communication, one selected from a plurality of reception points receives data transmitted from a UE. The selecting of one reception point may be made by a sub frame unit. In relation to a CS/CB type communication, while it is determined which reception point receives data transmitted from a UE, data are received through coordinated scheduling/beamforming between a corresponding reception point and a plurality of other reception points.

In the CoMP communication in a BS, transmission points or reception points may be responsible for sectors. Transmission points or reception points may be controlled by one BS. A coordination between points is performed in one BS. Therefore, a real-time coordination may be performed, and thus, a JT/JR class CoMP communication may be easily performed.

Figure 7B:
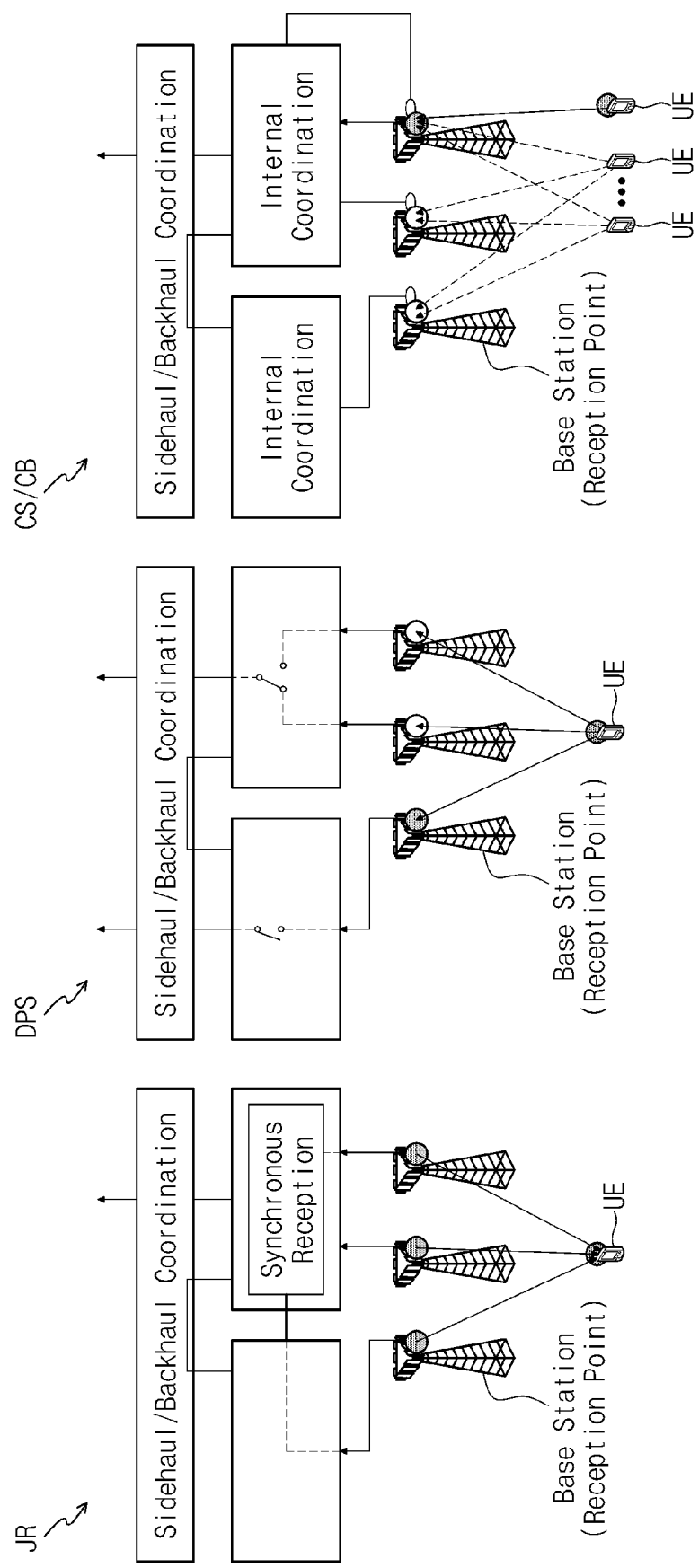

FIGS. 7A and 7B are views illustrating the DL and UL communication of a CoMP communication between BSs or CBSs or BS and CBS. Referring to FIGS. 3, 4, 7A, and 7B, in the DL communication of a CoMP communication between BSs, for example, a JP type JT class communication, an anchor BS (i.e., a main BS for managing communication with a UE) receives one backhaul traffic and auxiliary BSs receive another backhaul traffic. The anchor BS and the auxiliary BSs transmit the backhaul traffic through synchronous transmission. For synchronization between the anchor BS and the auxiliary BSs, a coordination through a sidehaul such as the X2 interface or a coordination through a backhaul such as the S1 interface is required. As another example, an anchor BS receives one backhaul traffic and forwards it to auxiliary BSs. At this point, a sidehaul/backhaul coordination between the anchor BS and the auxiliary BSs is required.

In a JP type DPS class communication, an anchor BS receives one backhaul traffic and auxiliary BSs receive another backhaul traffic. Selecting a transmission BS may be performed by a sub frame unit. In order to select one that transmits a backhaul traffic among an anchor BS and auxiliary BSs, a coordination through a sidehaul such as the X2 interface or a coordination through a backhaul such as the S1 interface is required between the anchor BS and the auxiliary BSs. As another example, an anchor BS receives one backhaul traffic and forwards it to auxiliary BSs. At this point, a sidehaul/backhaul coordination between the anchor BS and the auxiliary BSs is required.

In a CS/CB type communication, while a BS to which one backhaul traffic is delivered is determined, a backhaul traffic is transmitted through a coordinated scheduling/beamforming between a corresponding BS and other BSs. For the coordinated scheduling/beamforming between the corresponding BS and other BSs, a coordination through a sidehaul such as the X2 interface or a coordination through a backhaul such as the S1 interface is required.

In the UL communication of a CoMP communication between BSs, for example, a JP type JR class, a plurality of BSs receive data transmitted from a UE through synchronous reception. For synchronization between the anchor BS and the auxiliary BSs, a coordination through a sidehaul such as the X2 interface or a coordination through a backhaul such as the S1 interface is required.

In a JP type DPS class communication, one selected from a plurality of reception points receives data transmitted from a UE. Selecting a reception point may be performed by a sub frame unit. In order to select one that receives a backhaul traffic among an anchor BS and auxiliary BSs, a coordination through a sidehaul such as the X2 interface or a coordination through a backhaul such as the S1 interface is required between the anchor BS and the auxiliary BSs.

In a CS/CB type communication, while it is determined which reception point receives data transmitted from a UE, a reception point receives data through a coordinated scheduling/beamforming between a corresponding reception point and other reception points. For the coordinated scheduling/beamforming between BSs, a coordination through a sidehaul such as the X2 interface or a coordination through a backhaul such as the S1 interface is required.

Figure 8:
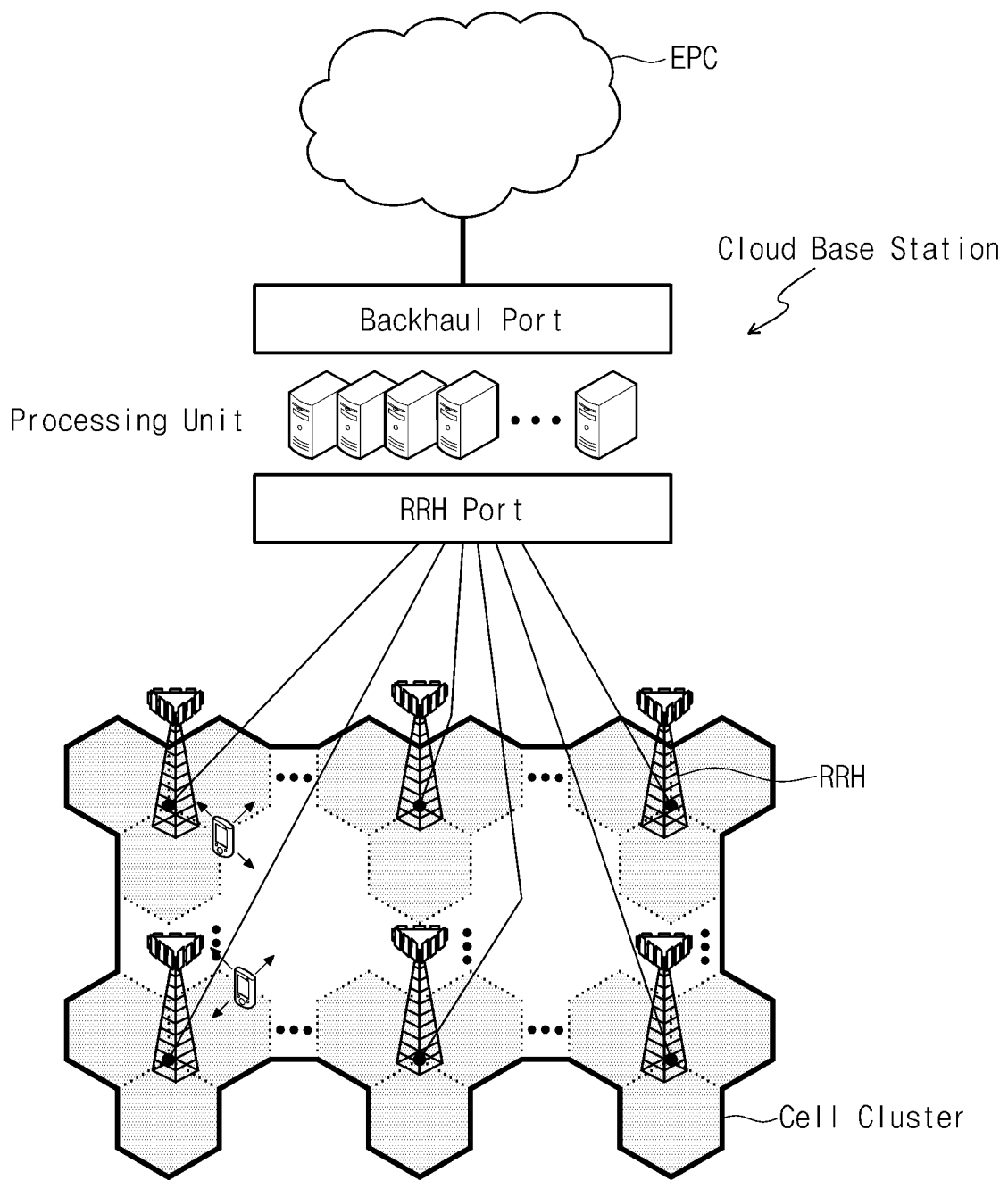
FIG. 8 is a view illustrating a cloud BS where Remote Radio Heads (RRHs) having a Radio Frequency (RF) front-end function and a processing unit for processing data are distributed and arranged.

FIG. 8 is a view illustrating a cloud BS (CBS) where Remote Radio Heads (RRHs) having a Radio Frequency (RF) front-end function and a processing unit for processing data are distributed and arranged. In an example, FIG. 8 illustrates CBS having new structure in which the CoMP is applied. Each RRH of the CBS may form a cell including at least one sector cell. A set of cells formed by a plurality of RRHs may be a cell cluster. That is, one CBS may operate one cell cluster.

When CoMP communication is performed between cells or sectors in a cell cluster, a coordination between a plurality of RRHs is performed by one processing unit. Like the CoMP communication in a BS, a coordination may be processed in real time. On the contrary, a coordination is performed between cell clusters through sidehaul/backhaul. Accordingly, a coordination between cell clusters may have delay time.

As described referring to FIG. 5, the CoMP JP is applied to three cells belonging to one conventional BS. Thus, the CoMP JP is limitedly applied. However, the CBS enhances cell clusters belonging to one CBS, and the CoMP JP is applied to the enhanced cell clusters. Thus, the CoMP is more effectively applied to the CBS than a conventional BS.

Figure 9:
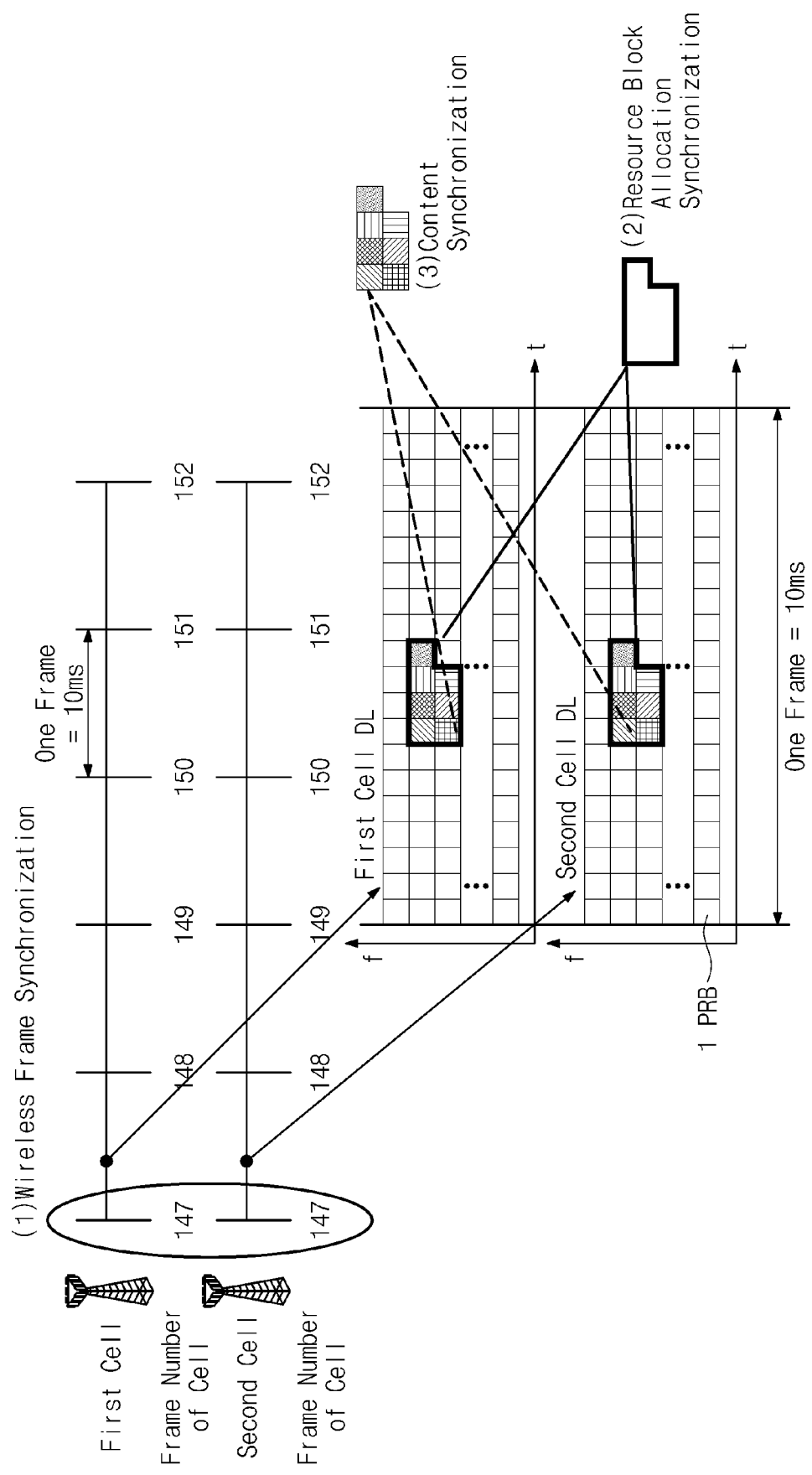
FIG. 9 is view illustrating a condition for implementing a synchronous transmission of the DL CoMP communication.

FIG. 9 is view illustrating a condition for implementing a synchronous transmission of the DL CoMP communication. For example, conditions that first and second cells perform the DL CoMP communication is performed according to a JT class are shown in FIG. 9. Referring to FIG. 9, DL frames that the first and second cells transmit are shown.

In order for the first and second cells to perform the DL CoMP transmission, three synchronizations are required. First, wireless frame synchronization is required. Only when a wireless frame that the first cell transmits is synchronized with one that the second cell transmits, the first and second cells perform the DL CoMP transmission. Second, a resource that the first cell allocates to a UE needs to be synchronized with one that the second cell allocates to a UE. In one wireless frame, only when the position of a Physical Resource Block (PRB) that the first cell allocates to a UE is identical to that of a PRB that the second cell allocates to a UE, the first and second cells may perform the DL CoMP transmission. Third, a content allocated to the PRB should be synchronized. Only when a content contained in a PRB that the first BS allocates to a UE is identical to that contained in a PRB that the second cell allocates to a UE, the first and second cells may perform the DL CoMP transmission.

FIG. 9 illustrates concepts of resource allocation synchronization. Internal allocations may be subdivided. Detailed processes may be adjusted based on the concepts. For example, the resource allocation may be performed in a basis of a resource element (RE), which corresponds to a symbol of 15 kHz. Fore three symbols are used as a PDCCH area (e.g., control area) up to three symbols. A PDSCH area (e.g., data area) is allocated up to 13 symbols. REs of the PDSCH area are allocated to CRS, CSI-RS, DM-RS, SIB, MIB, etc.

Figure 10:
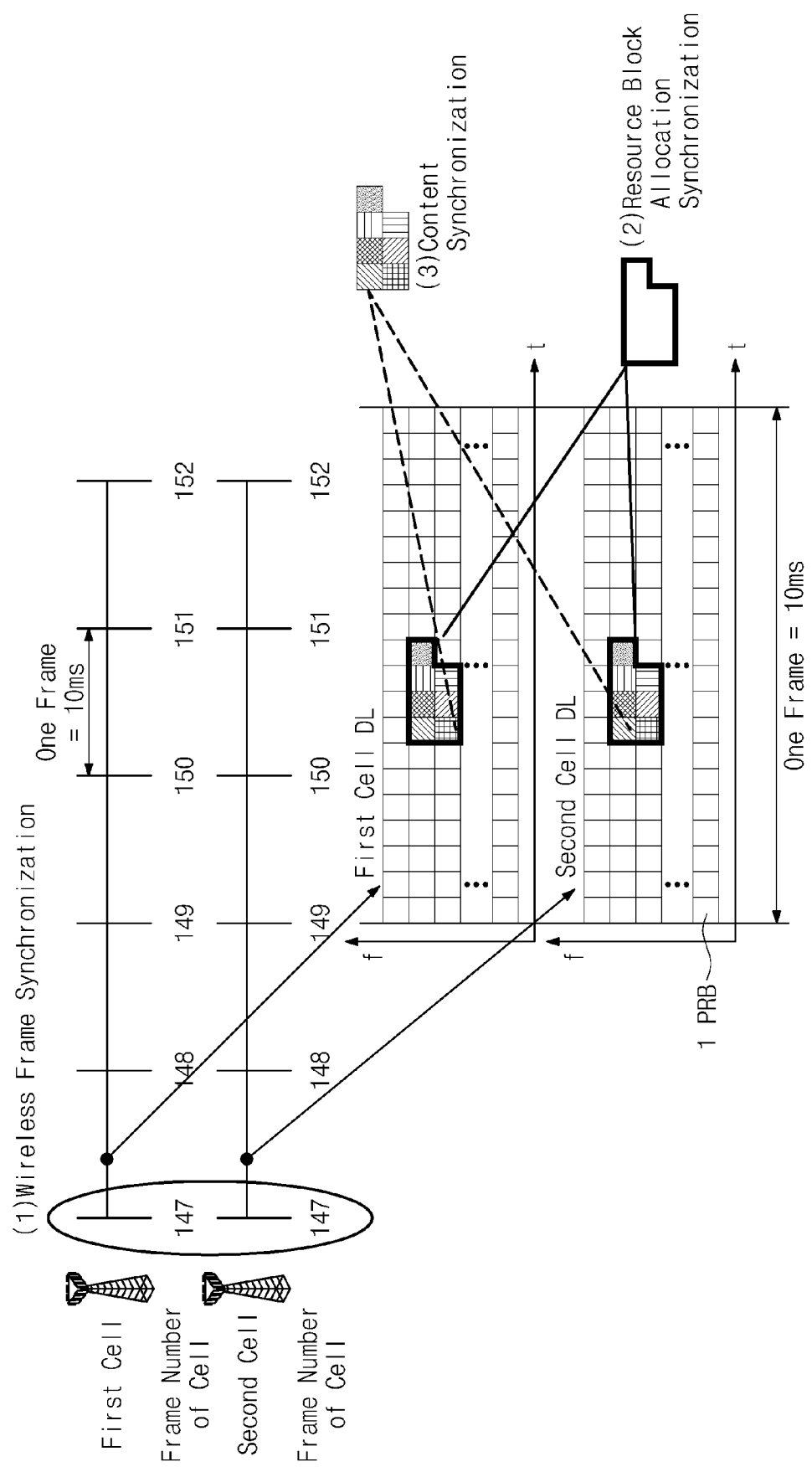
FIG. 10 is a view illustrating a condition for implementing a synchronous reception of the UL CoMP communication.

FIG. 10 is a view illustrating a condition for implementing a synchronous reception of the UL CoMP communication. For example, a condition that first and second cells perform the UL CoMP communication according to the JR class is shown in FIG. 10. Referring to FIG. 10, UL frames that the first and second BSs transmit are shown.

In order for the first and second cells to perform the UL CoMP transmission, three synchronizations are required. First, wireless frame synchronization is required. Only when a wireless frame that the first BS transmits is synchronized with one that the second cell transmits, the first and second cells perform the DL CoMP transmission. That is, only when the DLs of CoMP cells are aligned; a delay difference in UL signals that the CoMP cells receive is less than the length of a Cyclic prefix (CP); and the amount of advance avoids interlock interference, the first and second cells perform the UL CoMP communication. Second, a resource that the first cell allocates to a UE needs to be synchronized with one that the second cell allocates to a UE. In one wireless frame, only when the position of a PRB that the first cell allocates to a UE is identical to that of a PRB that the second cell allocates to a UE, the first and second cells may perform the DL CoMP transmission. Third, a content allocated to the PRB should be synchronized. Since a UL content transmission point is a UE, content synchronization is satisfied.

As mentioned above, in order to perform the CoMP communication, a synchronization between different BSs is required. Additionally, a sidehaul/backhaul coordination is required between different cells. A coordination through sidehaul/backhaul may have delay time. The delay time may prevent synchronization for the CoMP communication. The present invention provides a device and method that provide normally-operating CoMP communication even when delay occurs due to a sidehaul/backhaul coordination.

FIG. 10 illustrates concepts of resource allocation synchronization. Internal allocations may be subdivided. Detailed processes may be adjusted based on the concepts.

Figure 11:
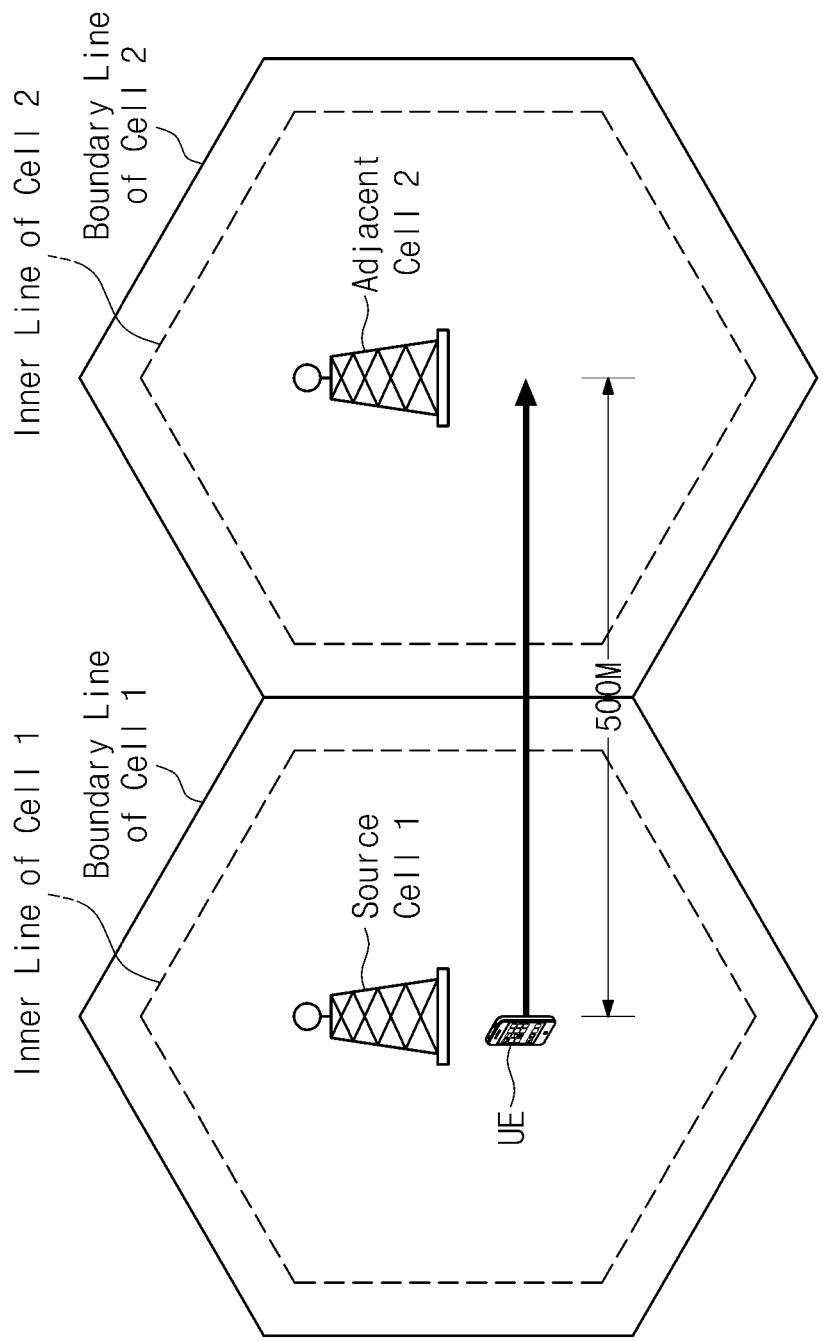
FIG. 11 is a view when a UE moves within cells supporting CoMP communication.

FIG. 11 is a view when a UE moves within cells supporting CoMP communication. Inner lines of first and second cells refer to areas where the CoMP communication is not performed but communication is served only by a cell. The inner line and the boundary line are not physically-divided areas, but are areas that are phenomenally (or logically) divided according to a CoMP communication procedure.

Figure 12:
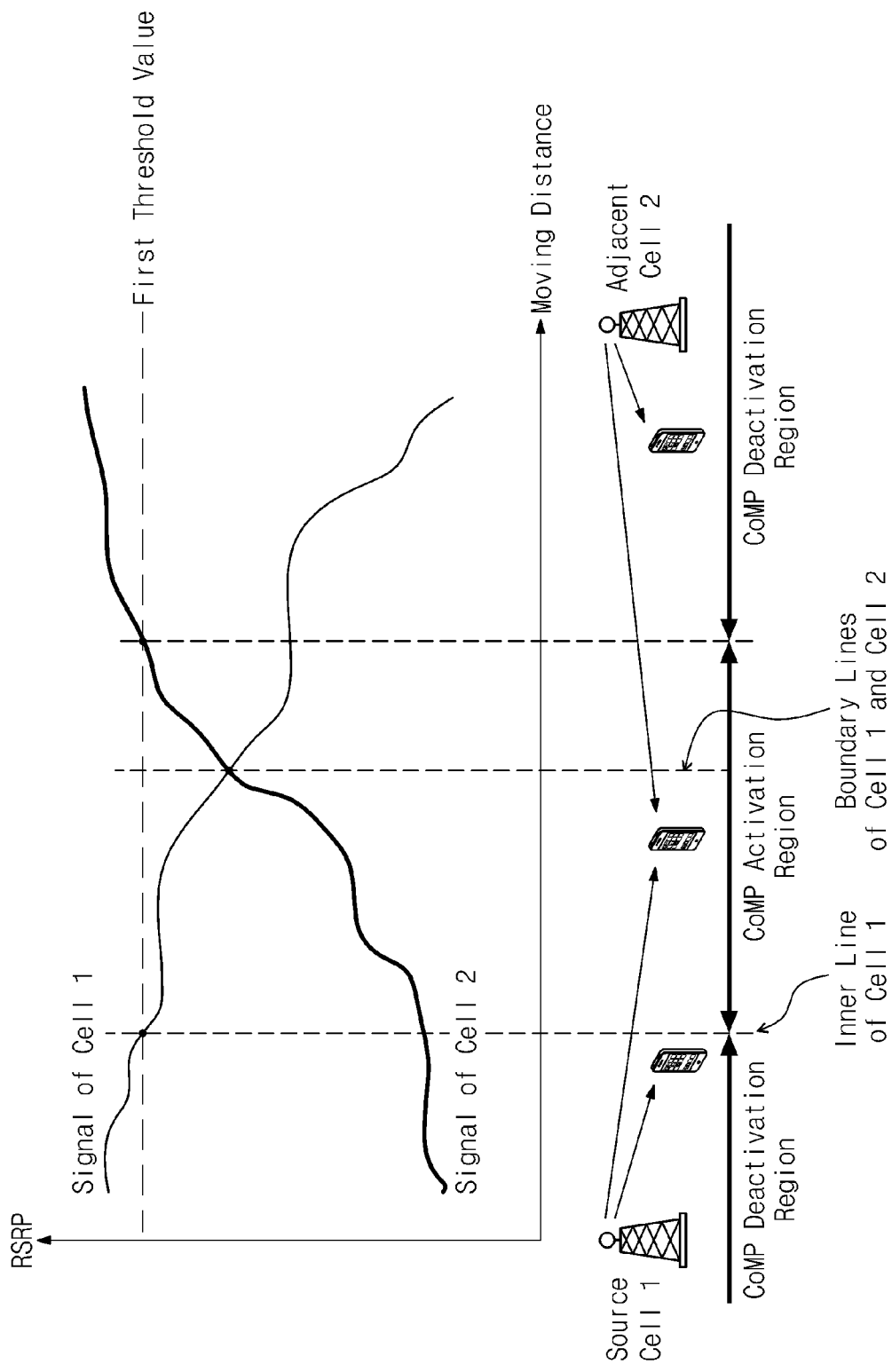
FIG. 12 is a view illustrating a change of Reference Signal Received Power (RSRP) of cells according to the movement of a UE.

FIG. 12 is a view illustrating a change of Reference Signal Received Power (RSRP) of cells according to the movement of a UE. For example, whether a CoMP is activated or not may be determined on the basis of a source cell. If the RSRP of a source BS becomes smaller than a first threshold value, a CoMP becomes activated.

If a CoMP cell is fixed with two, a CoMP set includes one having the strongest signal among a serving cell (i.e. an anchor cell) and adjacent cells.

If a CoMP cell is fixed with three, a CoMP set may include a cell having the strongest intensity, and a cell having a higher signal intensity than a value obtained by subtracting an arbitrary parameter value from a signal intensity of an adjacent cell having the highest signal intensity, among a serving cell (i.e. an anchor cell) and adjacent cells.

If the signal intensity of a serving cell is higher than a first threshold value, the CoMP communication stops.

Figure 13:
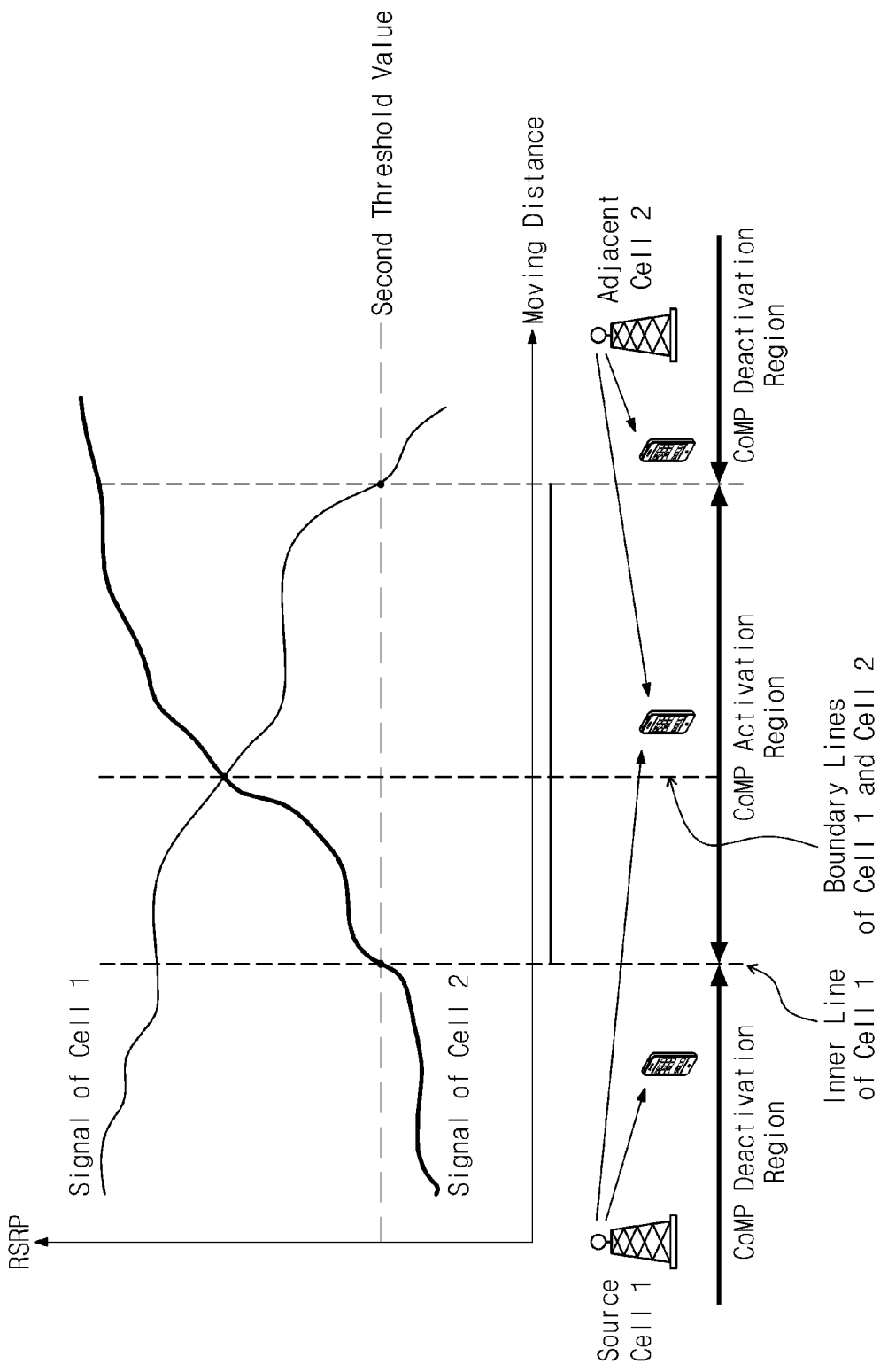
FIG. 13 is a view illustrating an RSRP change of cells according the movement of a UE of FIG. 11.

FIG. 13 is a view illustrating an RSRP change of cells according the movement of a UE of FIG. 11. Whether a CoMP is activated is determined on the basis of an adjacent cell. When a signal intensity of an adjacent cell having no RRC connection becomes higher than a second threshold value, a corresponding adjacent cell may be added to a CoMP coordination set. If there is no adjacent cell having a higher signal intensity than the second threshold value, a CoMP is not performed. If a signal intensity of a serving cell is higher than the first threshold voltage (refer to FIG. 12), a CoMP is not performed.

As another example, whether to activate a CoMP is determined complexly. Referring to FIGS. 12 and 13, when a signal intensity of a serving cell becomes lower than the first threshold value, a CoMP is considered, but if there is no adjacent cell having a higher signal intensity than the second threshold value, a CoMP may not be performed.

Determining the first and second threshold values may be made diversely according to a cell layout and scheme. In an aspect of the cell layout, the first threshold value may be determined with a value that increases system capacity and coverage through a CoMP at the serving cell side. The second threshold value may be determined with a value that is almost equal to the intensity of a signal of an adjacent cell, with which effects may be obtained through a CoMP. These values may be set commonly in all CoMP schemes, and may be set differently according to UL/DL, JT/JR, DPS, and CS/CB schemes.

As another example, CoMP activation may be determined by MAC-MAC signaling. For example, CoMP activation may be determined by MAC-MAC signaling according to momentary wideband/subband CQI. Or, according to a CoMP related item of a long-term perspective in this class determination structure, RRC determines CoMP activation/deactivation in a way that the RRC determines. The RRC provides connection information on a corresponding CoMP UE. Also, determining a CoMP anchor cell according to a momentary change may be performed by MAC-MAC signaling, and a change of an anchor cell may be notified to the RRC. For example, during communication between BSs, determining CoMP activation/deactivation is performed through RRC. Additionally, a change of an anchor cell in a CoMP activation region is used for a communication situation of a BS through MAC-MAC signaling.

Figure 14:
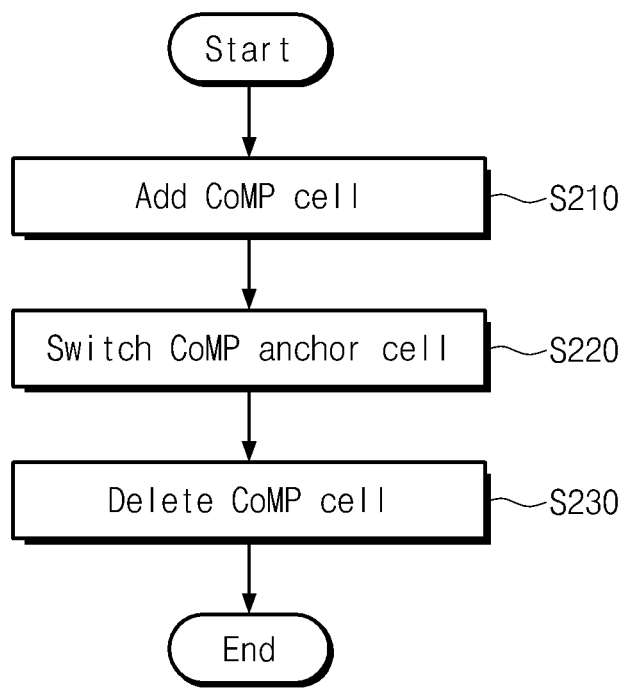
FIG. 14 is a flowchart illustrating a CoMP communication method according to an embodiment of the present invention.

FIG. 14 is a flowchart illustrating a CoMP communication method according to an embodiment of the present invention. Referring to FIGS. 5 and 14, a CoMP cell is added in operation S210. For example, while a cell of a first BS establishes communication with a UE, as the UE approaches a second BS, a cell of the second BS is added as a CoMP cell.

In operation S220, a CoMP anchor cell is switched. When the UE approaches toward the cell of the second BS, it is switched to an anchor cell.

In operation S230, a CoMP cell is deleted. When the UE enters into the cell of the second BS, i.e., the anchor cell, it deletes the cell of the first BS from the CoMP cells.

Figure 15:
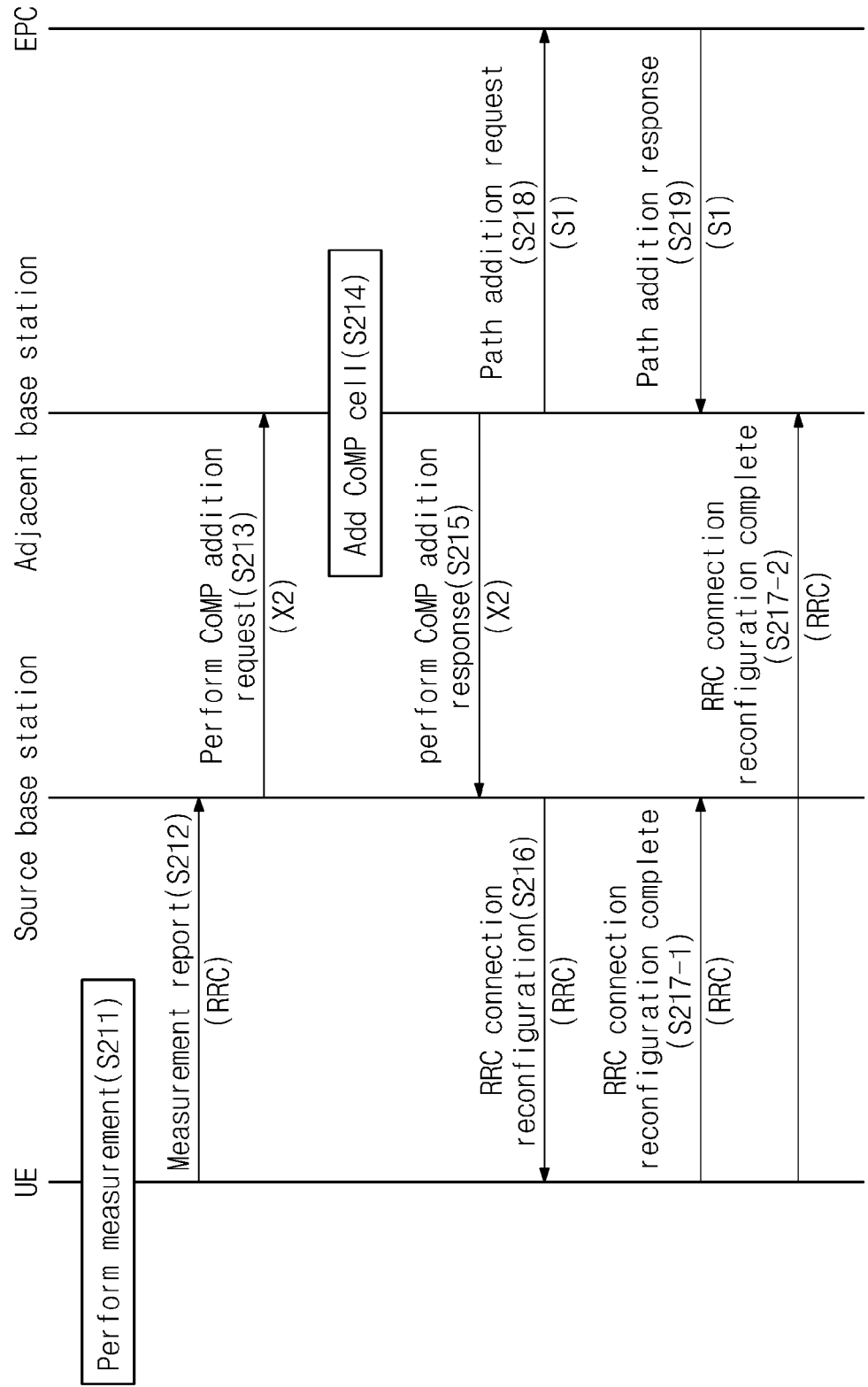
FIG. 15 is a flowchart illustrating operation for adding a CoMP cell.

FIG. 15 is a flowchart illustrating operation S210 for adding a CoMP cell. FIGS. 16A to 16G are views illustrating a packet flow according a CoMP cell adding operation. For example, a basic packet flow is shown in (1) to (5) of FIGS. 16A to 16E. Referring to FIGS. 5, 15, and 16A to 16G, in operation S211, a UE performs a measurement operation. In operation S212, the UE provides a measurement report to a source BS. The measurement report may be performed through a RRC interface.

For example, as shown in FIG. 12, when the RSRP of an anchor cell becomes smaller than the first threshold value, a measurement report may be provided. As shown in FIG. 13, when the RSRP of an adjacent cell becomes greater than the second threshold value, a measurement report may be provided. As shown in FIGS. 12 and 13, when the RSRP of an anchor cell becomes smaller than the first threshold value and the RSRP of an adjacent cell becomes greater than the second threshold value, a measurement report may be provided.

In operation S213, a source BS transmits a CoMP addition request to an adjacent BS. The CoMP addition request determines one scheme (for example, JT/JR, DPS, or CS/CB) of each of a UL CoMP and/or DL CoMP and an application time (for example, a sub frame number (SFN) as an activation time), and includes information (for example, a cell ID, an antenna port, and CRS information) necessary for a current anchor cell related to a CoMP. The CoMP addition request may include Cell specific Reference Signal (CRS) information on a source BS. The operations S211 through S213 may correspond to FIGS. 16A and 16B.

In operation S214, an adjacent BS performs a CoMP cell addition operation, and transmits a CoMP addition response in operation S215. An adjacent BS may transmit access information for reception forwarding (such as T-b1, T-b2, and related Transport Layer Address). An adjacent BS may transmit its own Cell CRS information to a source BS.

In operations S216 and S217_1, the source BS may reconfigure RRC connection with a UE. The source BS notifies the UE of CoMP activation and a feedback type of a mobile terminal. For example, the feedback type may be set to report CQI/RI/PMI in the combination of the source BS and the adjacent BS. That is, a feedback of one BS may be set to be transmitted together with a feedback of another BS. The operations S216 and S217_1 may correspond to FIG. 16D.

In operation S218, the adjacent BS transmits a path addition request to the EPC. The adjacent BS provides access information (T-b3 and a transport layer address) of a BS that is to receive DL from serving gateway (S-GW), i.e., a component of the EPC, to the S-GW through the MME. At this point, UL access information (T-g1) of the S-GW used in a source BS may be provided.

In operation S219, the adjacent BS receives a path addition response from the EPC. The S-GW determines whether to change a transport layer address and use T-g1 or change T-g1. The operations S218 and S219 may correspond to FIG. 16C. For example, the operations S216 to S217_1 and operations S218 to S219 may be performed simultaneously or according to a predetermined order. After that, an anchor cell change may be occurred. FIG. 16E illustrates an occurrence of anchor cell change following to FIGS. 16C and 16D.

Figure 16A:
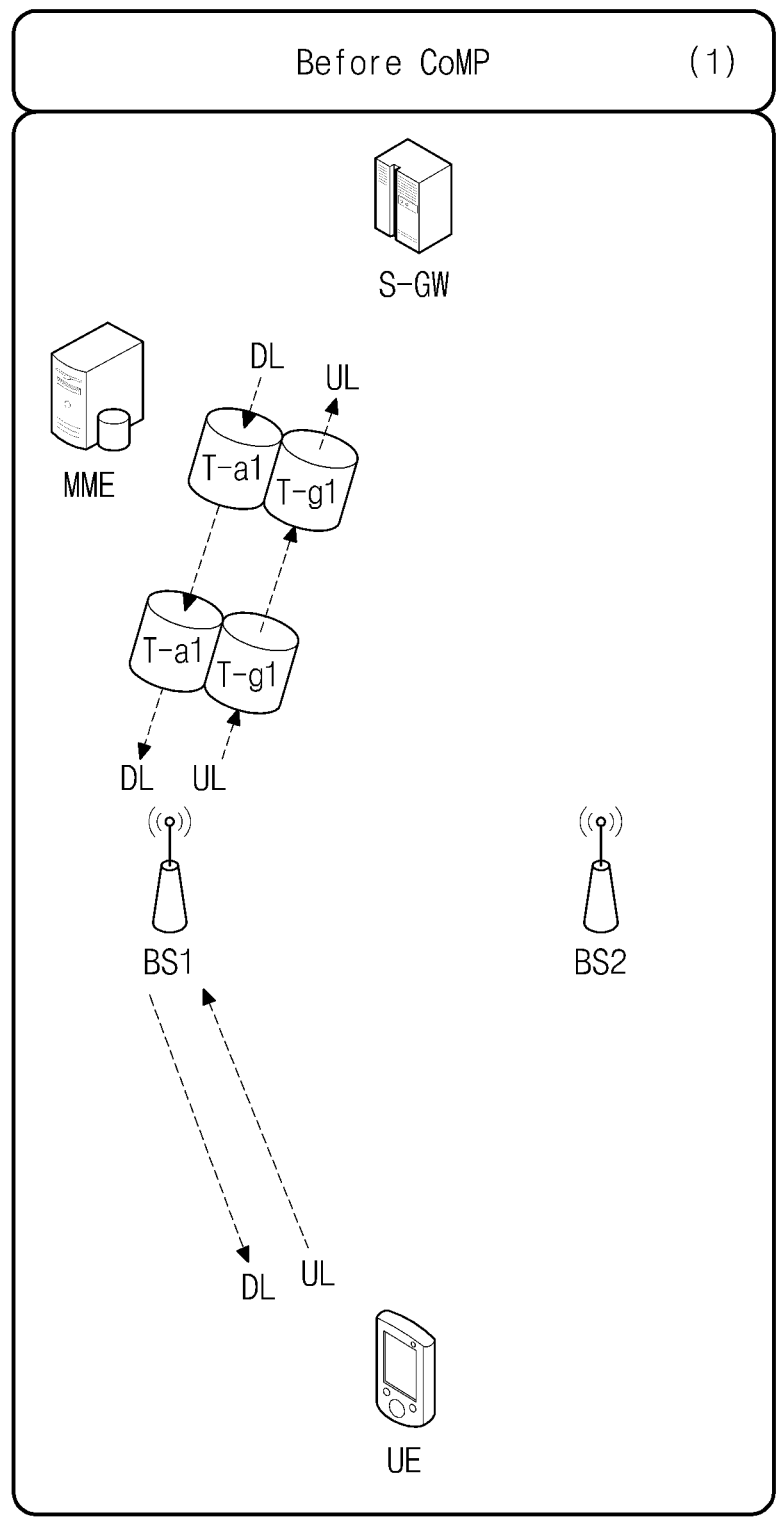
FIGS. 16A to 16G are views illustrating a packet flow according a CoMP cell adding operation.
Figure 16B:
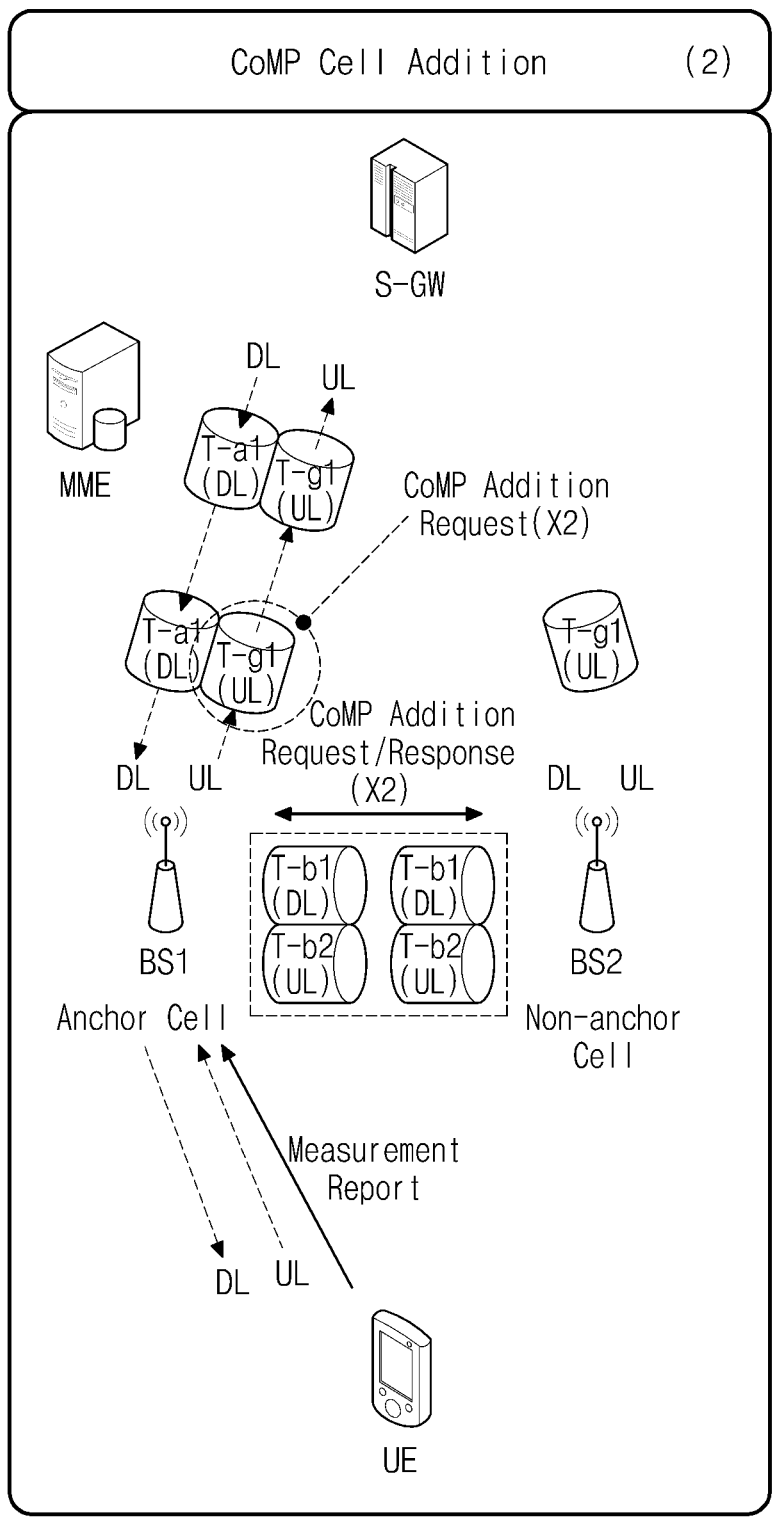
Figure 16C:
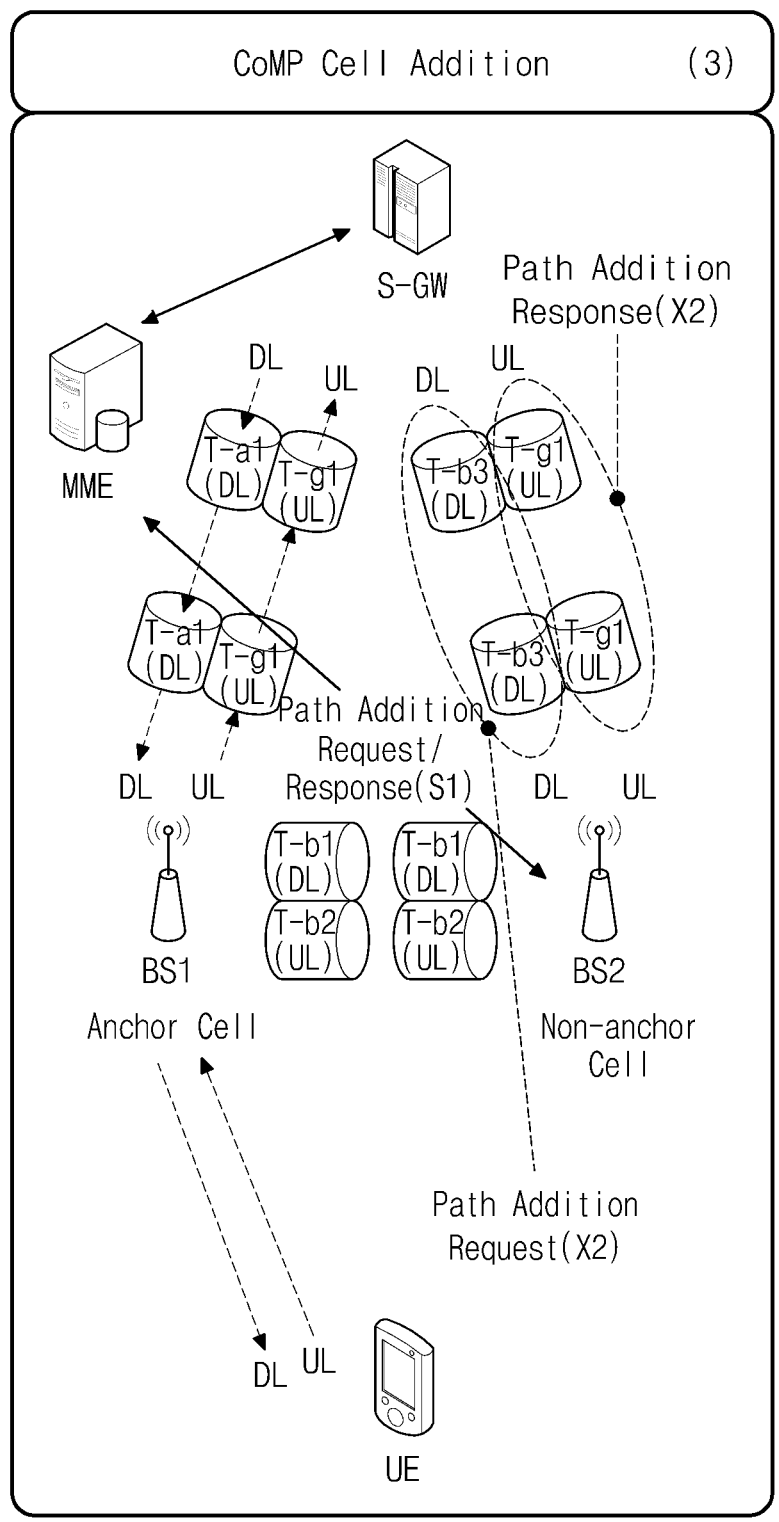
Figure 16D:
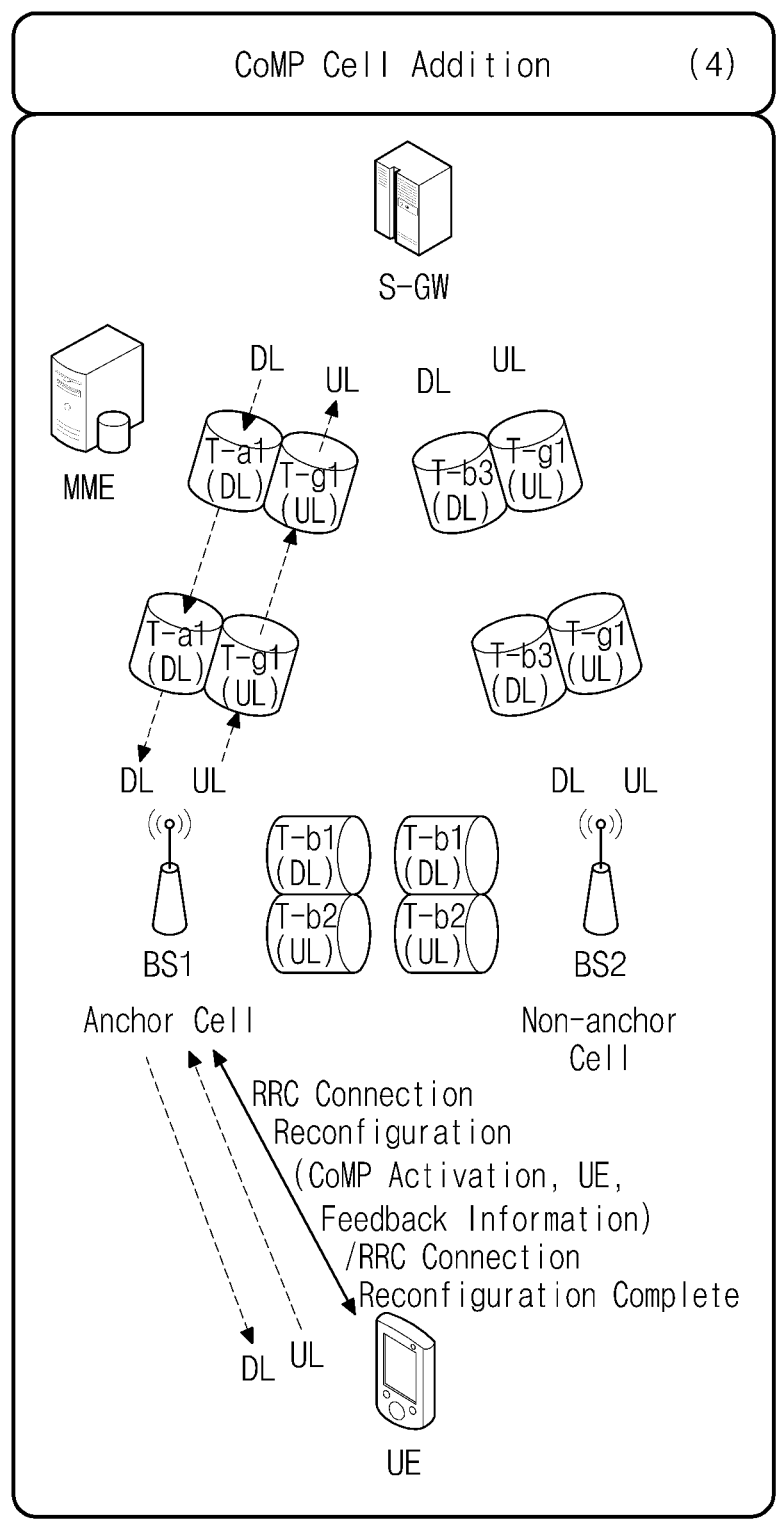
Figure 16E:
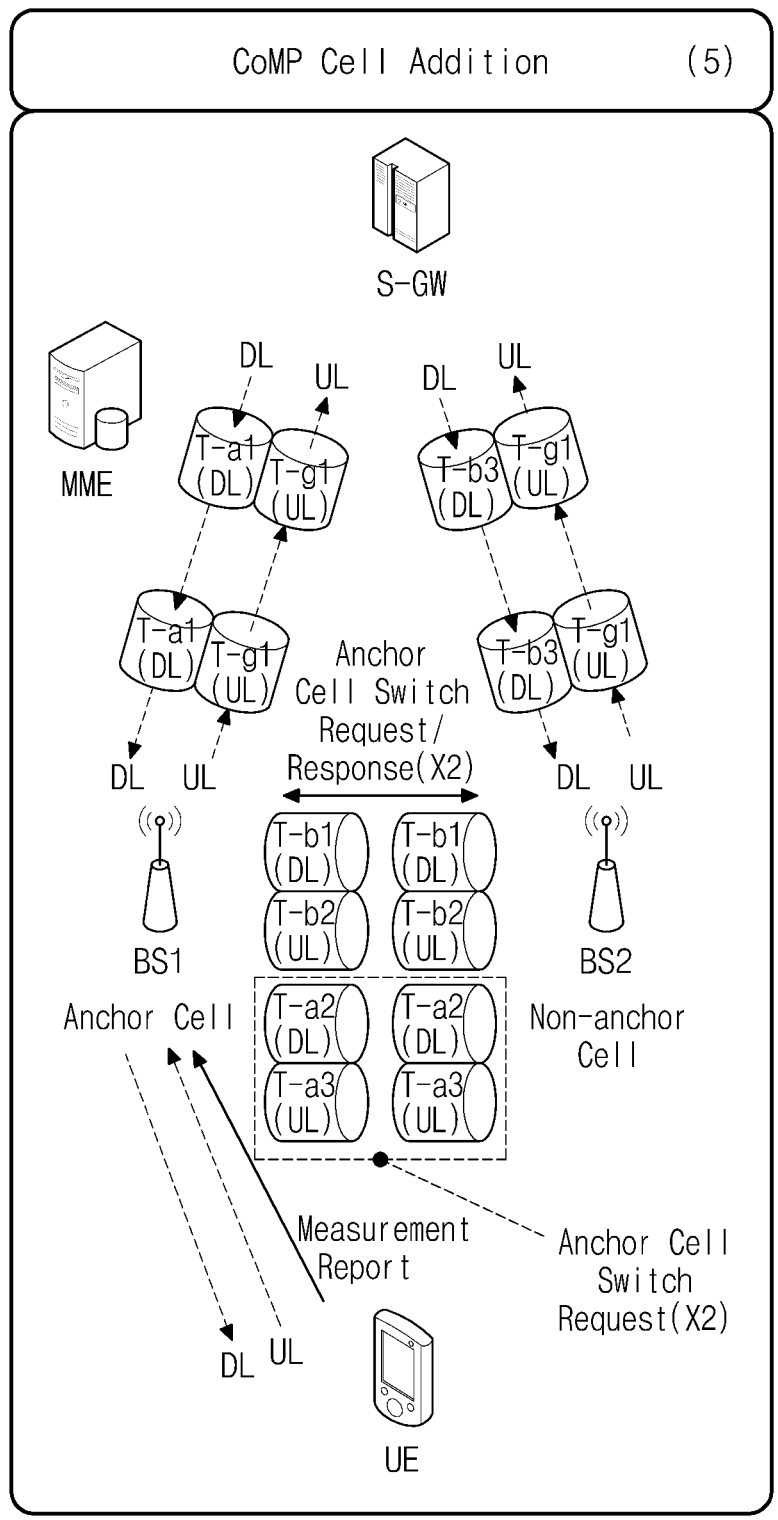
Figure 16F:
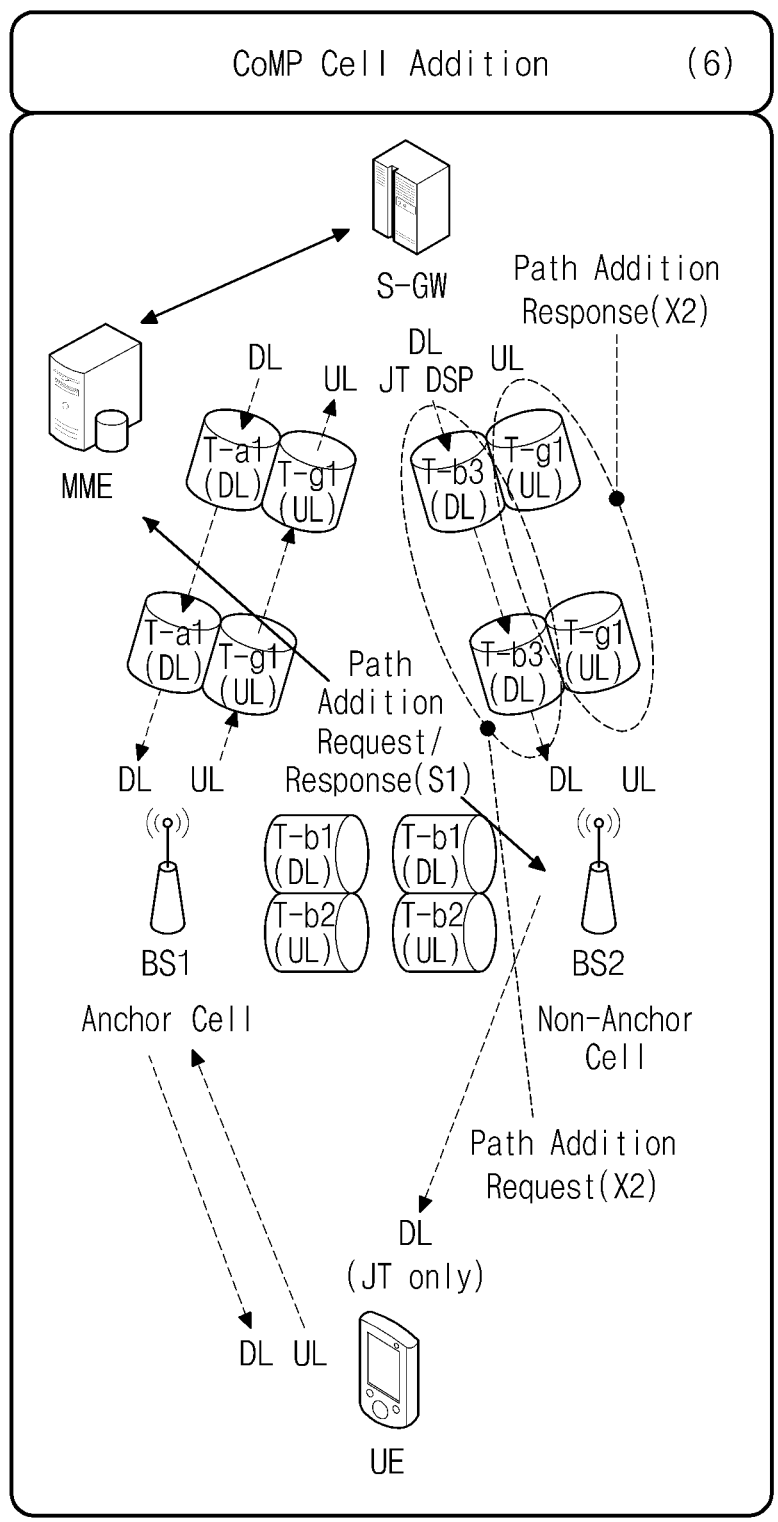
Figure 16G:
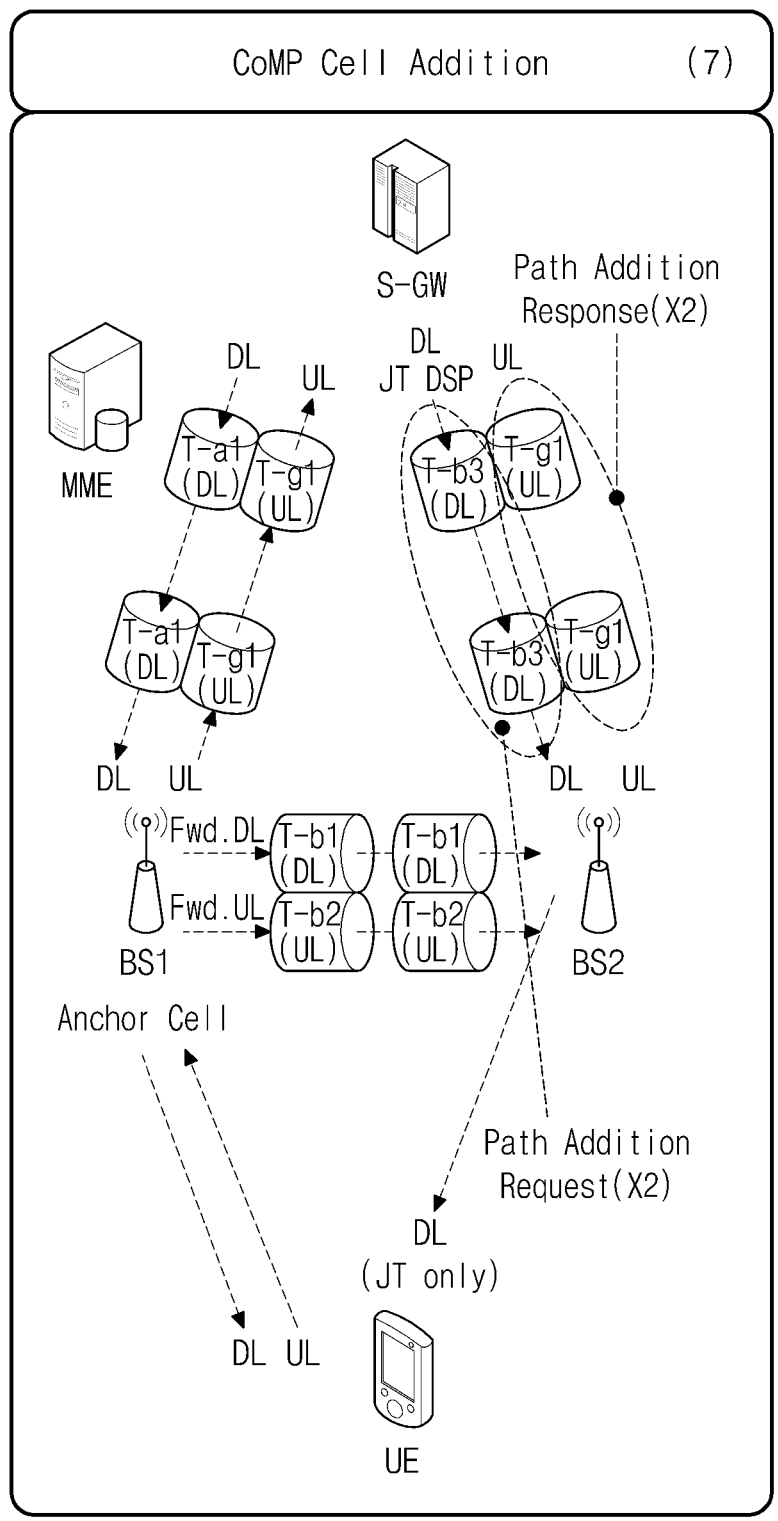

In a JT and DPS scheme is selected, it proceeds from (2) of FIG. 16B to (6) of FIG. 16F, so that a DL traffic may be simultaneously transmitted as typical DL access information (T-a1) and newly added DL access information (T-b3). At this point, absolute time information for synchronization may be included in a DL packet. Or, it proceeds from (2) of FIG. 16B to (7) of FIG. 16G. That is, after a message is received, on the basis of the message information, a DL traffic is transmitted as T-a1 wirelessly and is site-forwarded as T-b1. A UL traffic may be transmitted as T-g1 and T-b2 simultaneously. At this point, time information for synchronization with respect to a traffic transmitted as T-b1 and T-b2 may be included.

In the CoMP cell addition operation, operations S213 and S215 are performed for the CoMP of a cell in an adjacent BS. Moreover, in relation to the CoMP cell addition, an anchor cell having the still good intensity of a signal provides information on a CoMP non-anchor cell to the UE in operations S216 and S217. By such a procedure, a two cell CoMP where two cells transmit/receive information is implemented between the UE, a current anchor cell, and an added non-anchor cell. Here, when a cell of another BS is added as a CoMP cell, operations S213, S215, S216, and S217_1 or S217_2 are performed so that a new CoMP cell is added to the existing BSs and the UE.

The UE may perform RRC connection reconfiguration with the source BS (S216). After that, as a first option, the UE may send the message of the RRC connection reconfiguration complete to the source BS (S217_1) unlike the handover processes described referring to FIG. 2. When the CoMP JP is applied, the source BS and adjacent BS are synchronized. Thus, the message of the RRC connection reconfiguration complete can be sent to the source UE. In some conditions, as a second option, the UE may the message of the RRC connection reconfiguration complete to the adjacent BS (S217_2).

In this case, the anchor cell transmits information on a new CoMP cell to a previously-added cell through operations S213 and S215, thereby notifying that the total number of CoMP cells is three. The anchor cell provides information on a current anchor cell and a previously-operating CoMP cell to the newly-added cell, so that it is notified that a total of three cells perform a CoMP operation. At this point, the anchor cell may receive a DL traffic and may forward it to another CoMP cell, or the S-GW may multicast a DL packet. In the latter case, a procedure for the S-GW to perform a DL multicasting operation is performed in operations S218 and S219. When the anchor cell forwards a DL packet, operations S218 and S219 may be omitted.

FIG. 15 and FIGS. 16A to 16G illustrate processes between different BSs, different CBSs or a BS and a CBS. Thus, FIG. 15 and FIGS. 16A to 16G illustrate X2 communications and S1 communications along with RRC communications. If the inventive concepts of the present invention are applied to processes in a BS or a CBS, the X2 communications and S1 communications may be replaced with corresponding internal processes or skipped. These features may be applied to FIG. 17 and FIGS. 18A to 18E and FIG. 19 and FIGS. 20A to 20C.

Figure 17:
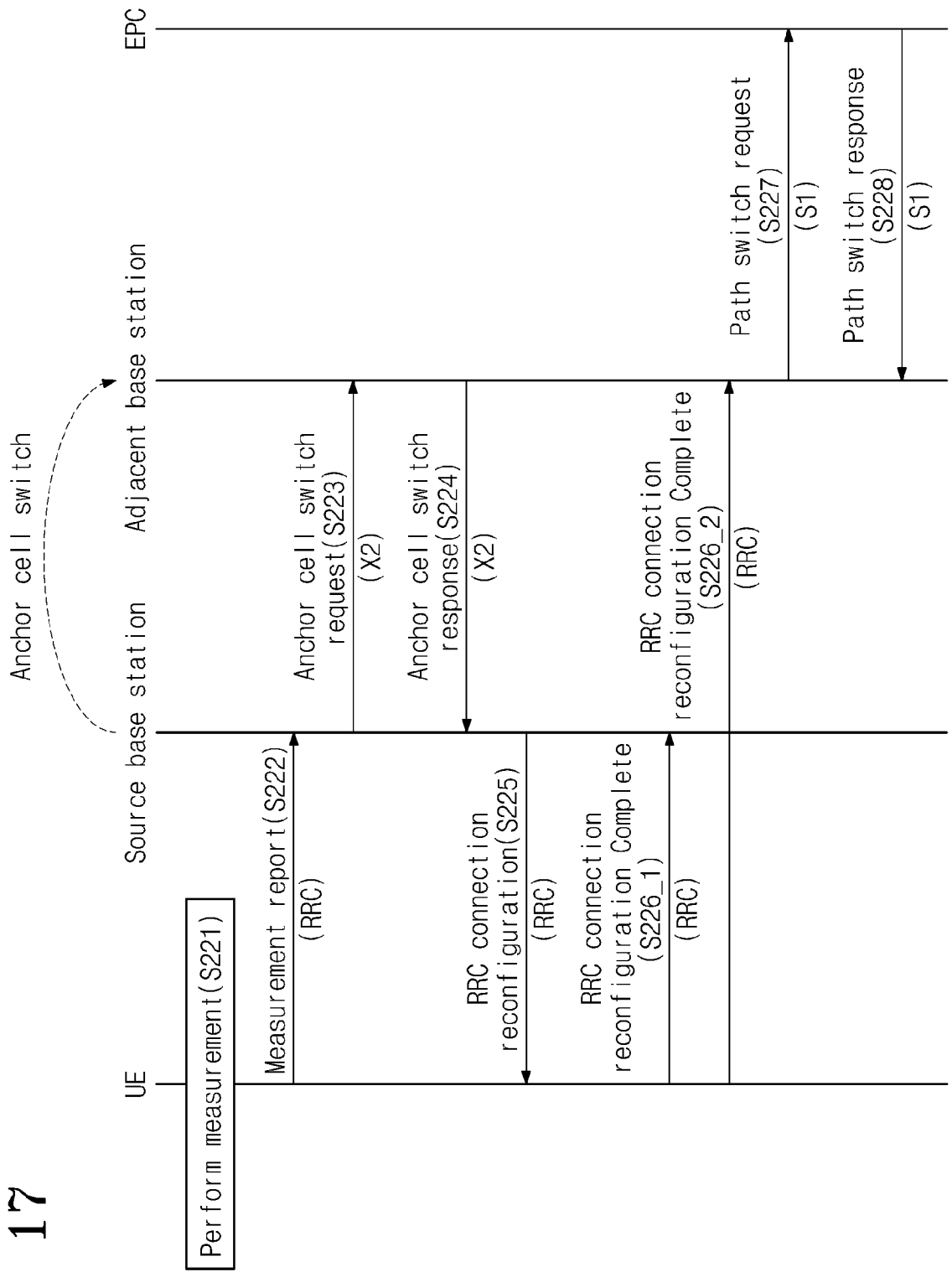
FIG. 17 is a flowchart illustrating an anchor cell change.
Figure 18A:
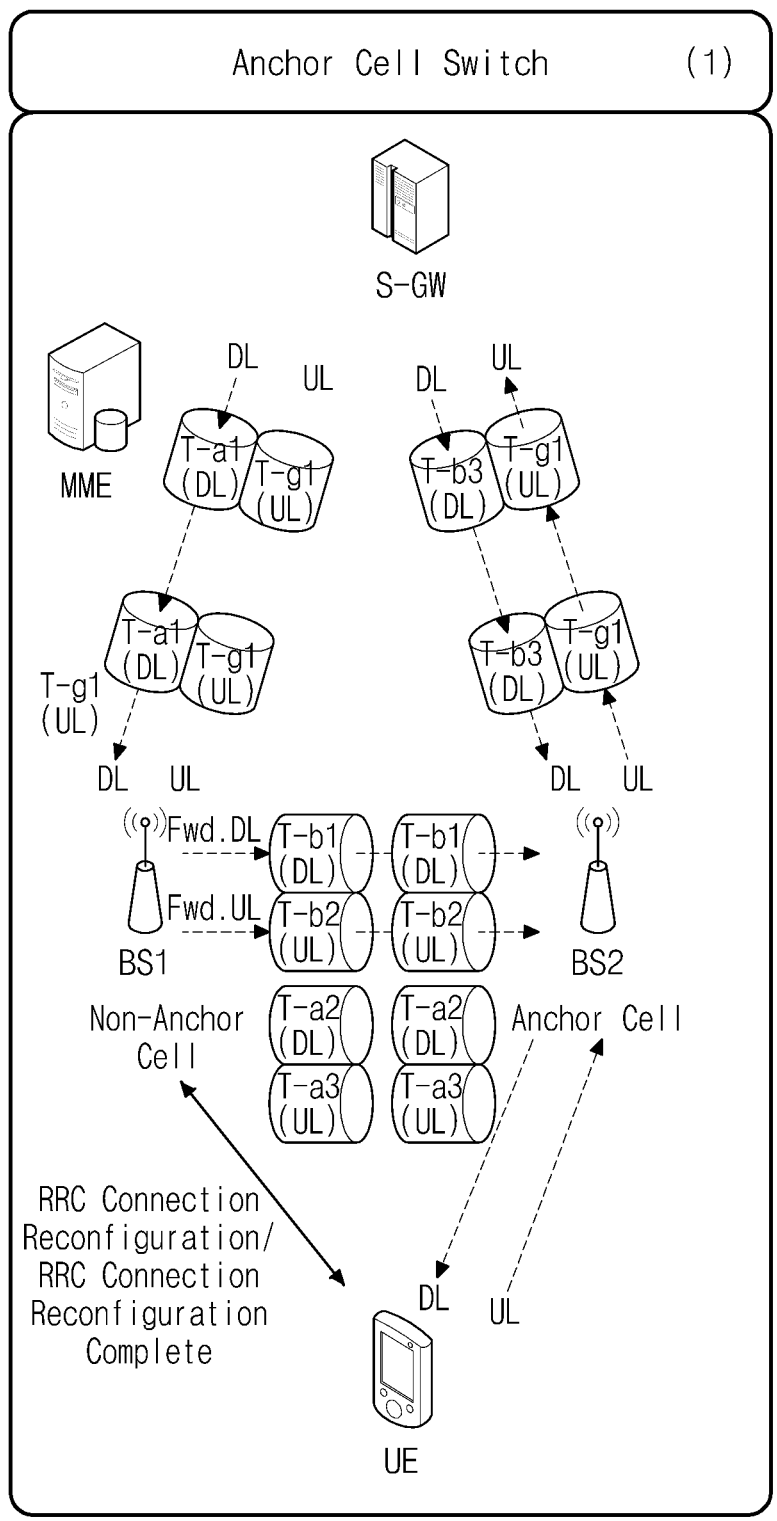
FIGS. 18A to 18F are views illustrating a packet flow according to an anchor cell change.
Figure 18B:
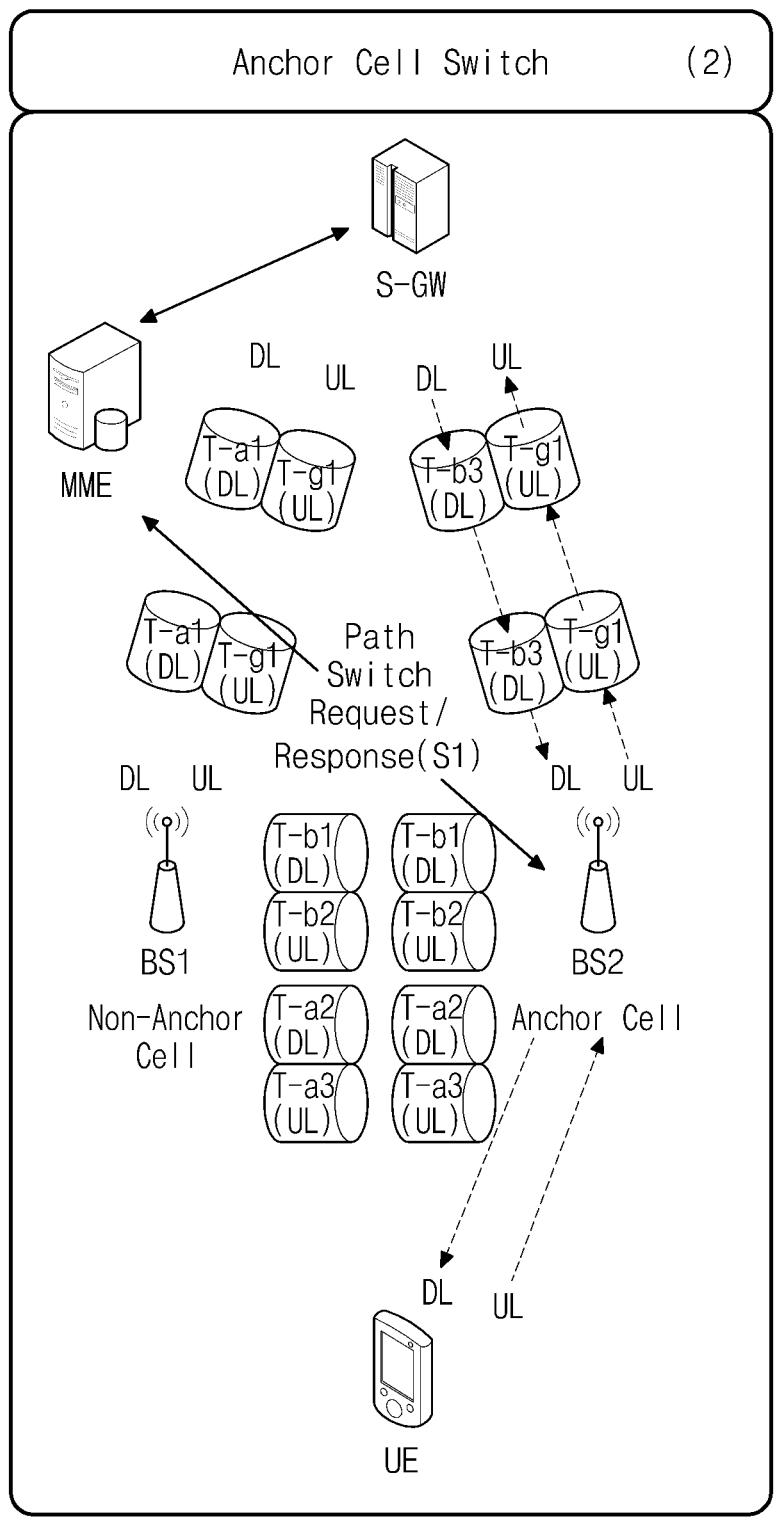
Figure 18C:
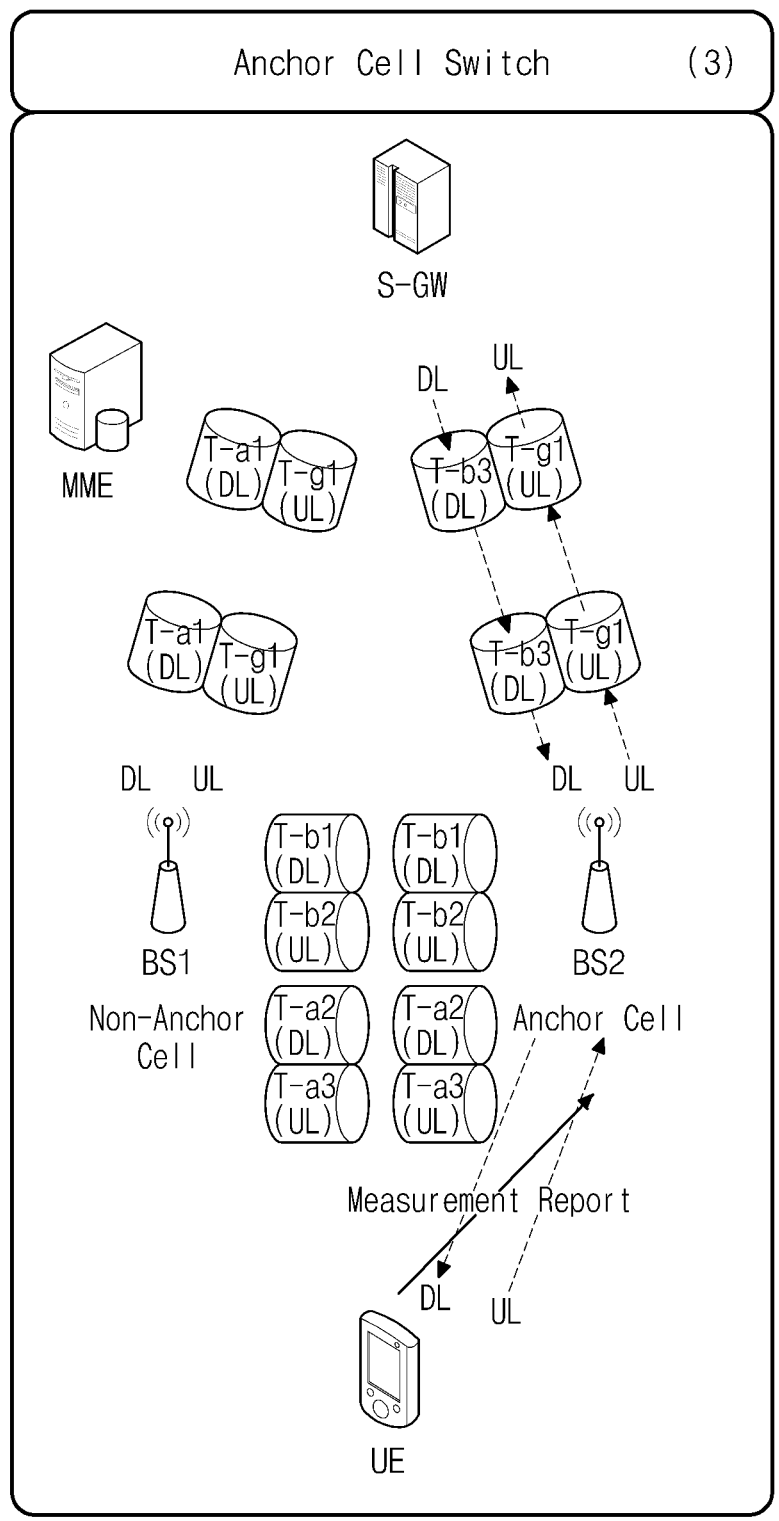
Figure 18D:
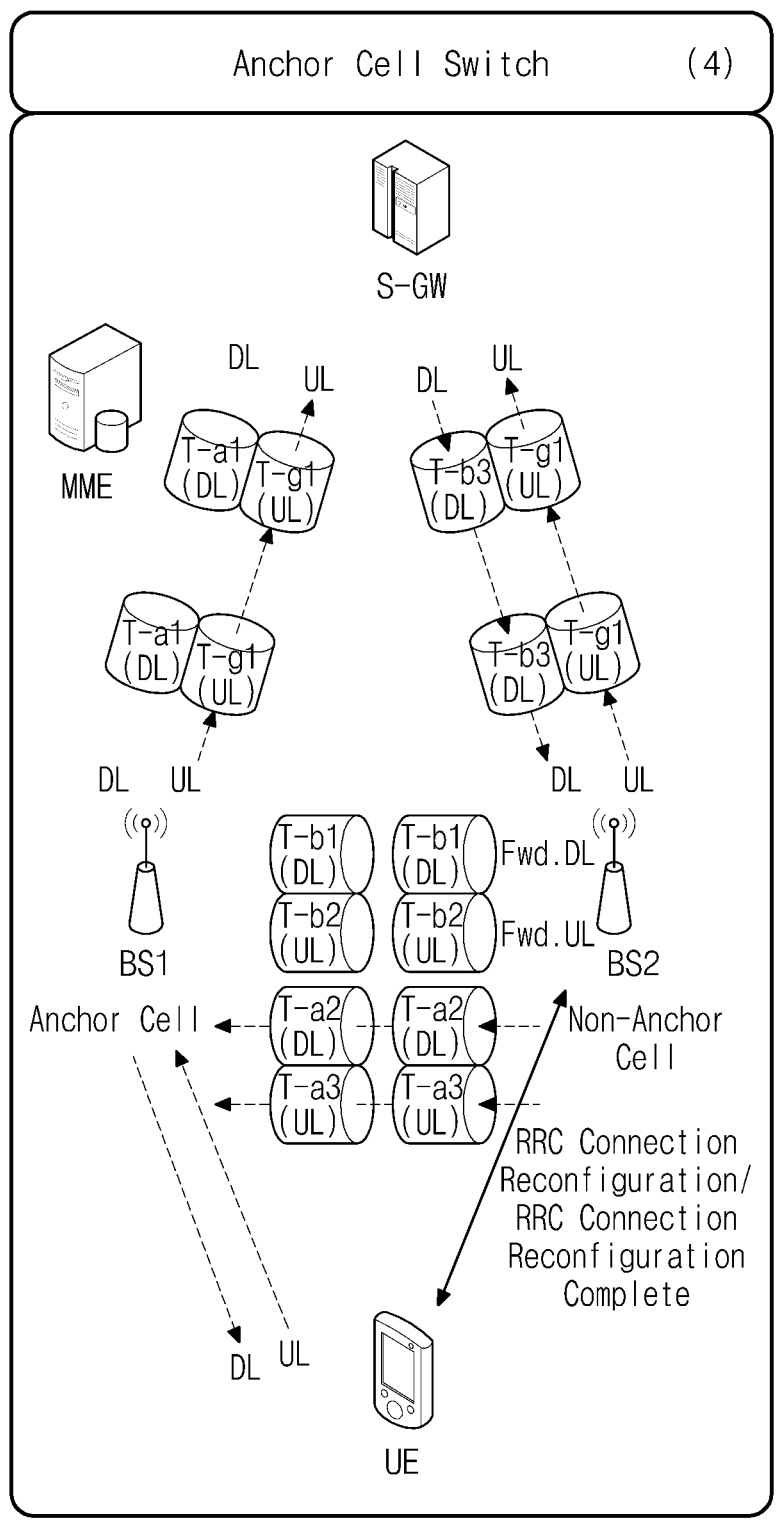
Figure 18E:
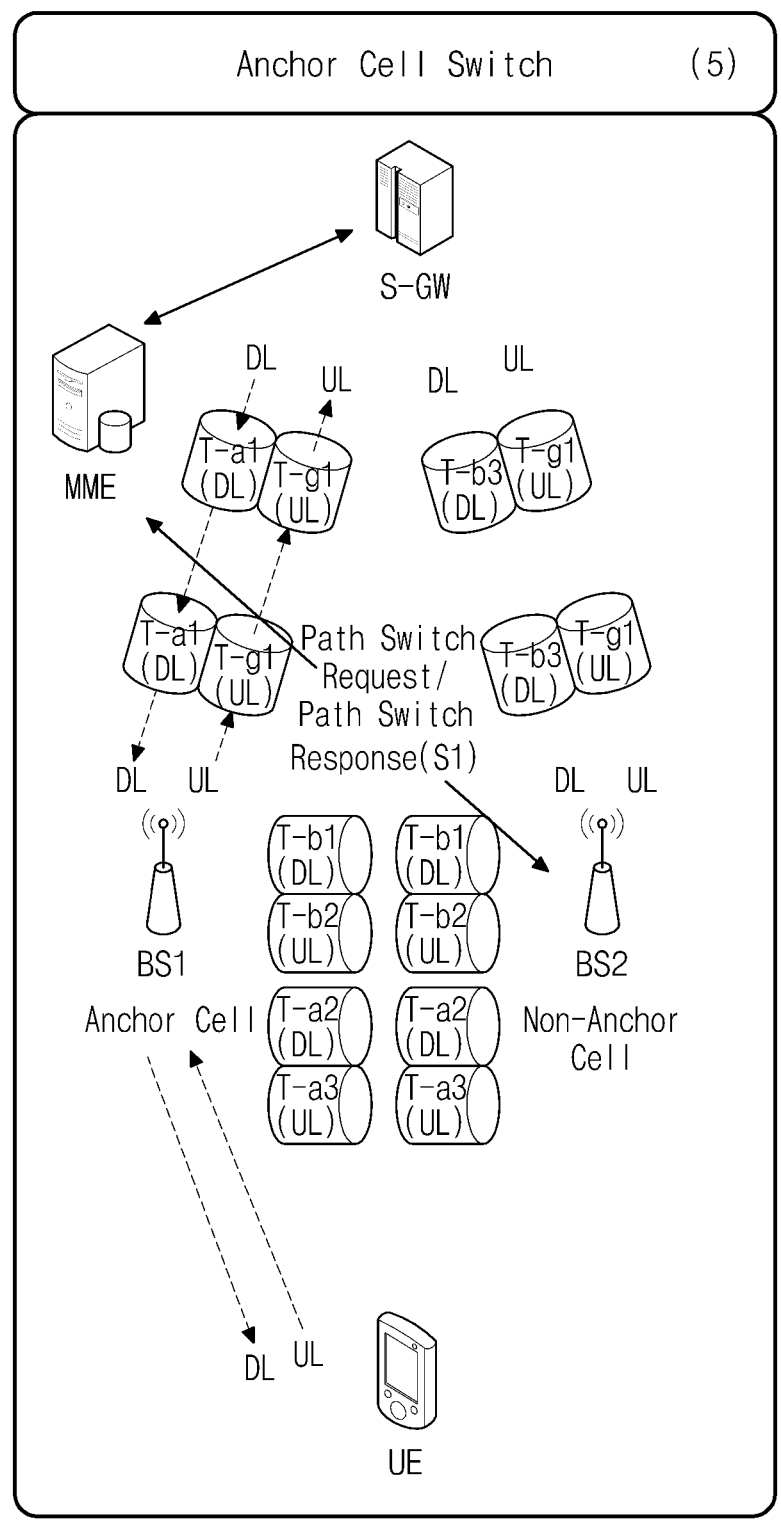
Figure 18F:
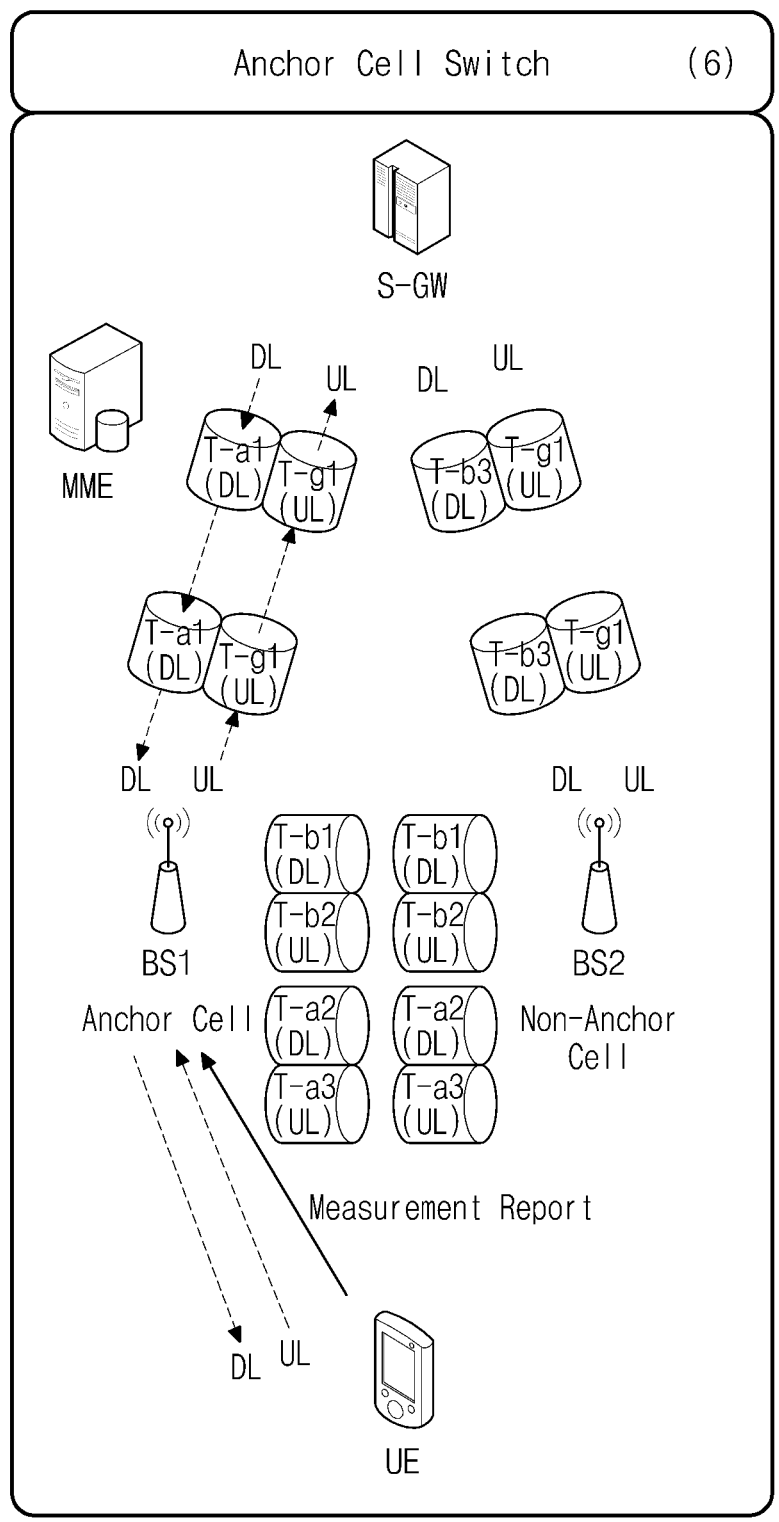

FIG. 17 is a flowchart illustrating an anchor cell change in operation S220. FIGS. 18A to 18F are views illustrating a packet flow according to an anchor cell change. Referring to FIGS. 5, 16E, 17, 18A, and 18B, the UE performs a measurement operation in operation S221 and performs a measurement report operation in operation S222. For example, when a signal intensity of an adjacent BS in the CoMP becomes stronger than that of the source BS, the measurement report operation is performed.

In operation S223, the source BS transmits an anchor cell change request to the adjacent BS. The anchor cell change request includes CoMP information on an anchor CoMP set including the anchor cell, that is, an anchor cell change and an application time for the anchor cell change (for example, a SFN). The anchor cell change request may include UL and DL forwarding access information (for example, T-a2 and T-a3) that the source BS selectively transmits to the adjacent BS.

In operation S224, the adjacent BS transmits an anchor cell change response to the source BS. The operations S221 through S224 may corresponds to FIG. 16E.

In operation S225 and S226_1, the source BS reconfigures RRC connection with the UE. The source BS may notify the UE of a change of an anchor cell, and then may reconfigure a feedback. Through a normal message process, the relationship between the source BS and the adjacent BS, i.e., members of a CoMP coordination set, is changed. The cell of the source BS changes from an anchor cell into a non-anchor cell, and the cell of the adjacent cell changes from a non-anchor cell into an anchor cell. As soon as the source BS takes back the message, a DL traffic transmitted through T-a1 is forwarded to T-b1, and some UL traffics are forwarded through T-b2 and transmitted to the S-GW through T-g1. A UL traffic from the UE is transmitted wirelessly to the S-GW via the adjacent BS and then T-g1, and a DL traffic received via T-a1 and then T-b1 is transmitted from the adjacent BS to a mobile terminal. The operations S225 and S226_1 may correspond to FIG. 18A.

In operation S227, the adjacent BS transmits a path change request to the EPC. In operation S228, the EPC transmits a path switch response to the adjacent BS. The EPC may change a main path for communication with the UE from the source BS into the adjacent BS. In the case of CS/CB, it is requested that a DL traffic is transmitted via T-b3 not T-a1. The operations S227 and S228 may correspond to FIG. 18B.

The UE may perform RRC connection reconfiguration with the source BS (S225). After that, as a first option, the UE may send the message of the RRC connection reconfiguration complete to the source BS (S226_1) unlike the handover processes described referring to FIG. 2. When the CoMP JP is applied, the source BS and adjacent BS are synchronized. Thus, the message of the RRC connection reconfiguration complete can be sent to the source UE. In some conditions, as a second option, the UE may the message of the RRC connection reconfiguration complete to the adjacent BS (S226_2).

In FIGS. 18C to 18F, a situation that an anchor cell is continuously toggled is shown. In the CoMP anchor cell switch situation of FIGS. 18A and 18B, if a measurement report indicates that a signal of a cell of a source BS is stronger than that of an adjacent BS, a procedure is performed in order to change an anchor cell from a cell of an original adjacent BS into a cell of an original source BS. In this case, if the same CoMP scheme is assumed, operations S223 and S224 of FIG. 17 may not be necessarily performed.

In the situation that an anchor cell is changed again or is not changed, with the condition that the CoMP scheme is changed, following procedures need to be performed if operations S223 and S224 of FIG. 17 are needed. Since it is assumed that the CoMP scheme is not changed, an anchor cell is changed and feedback information on a mobile terminal is changed if necessary. At this point, when operation S223 is performed, a DL traffic is transmitted via T-b3 and then T-a2, and some UL traffics are transmitted via T-a3 and then T-g1. Once operation S224 is performed, a UL traffic is transmitted via the UE, the adjacent BS, and then T-g1, and a DL traffic is transmitted from the source BS to the UE via T-b3, and T-a2. Once operations S227 and S228 are performed, a DL traffic is transmitted from the source BS to the UE via T-a1.

In the CoMP anchor cell switch operation, if the signal intensity of the adjacent cell is stronger than that of the source cell, the anchor cell notifies the adjacent BS that the anchor cell is changed through operations S223 and S224. The source BS may notify the UE of the anchor cell change through operations S225 and S226. Moreover, through operations S227 and S228, the EPC (for example, an MME) recognizes the anchor cell change, and transmits a S1 message to the adjacent BS, i.e., the changed anchor cell.

Figure 19:
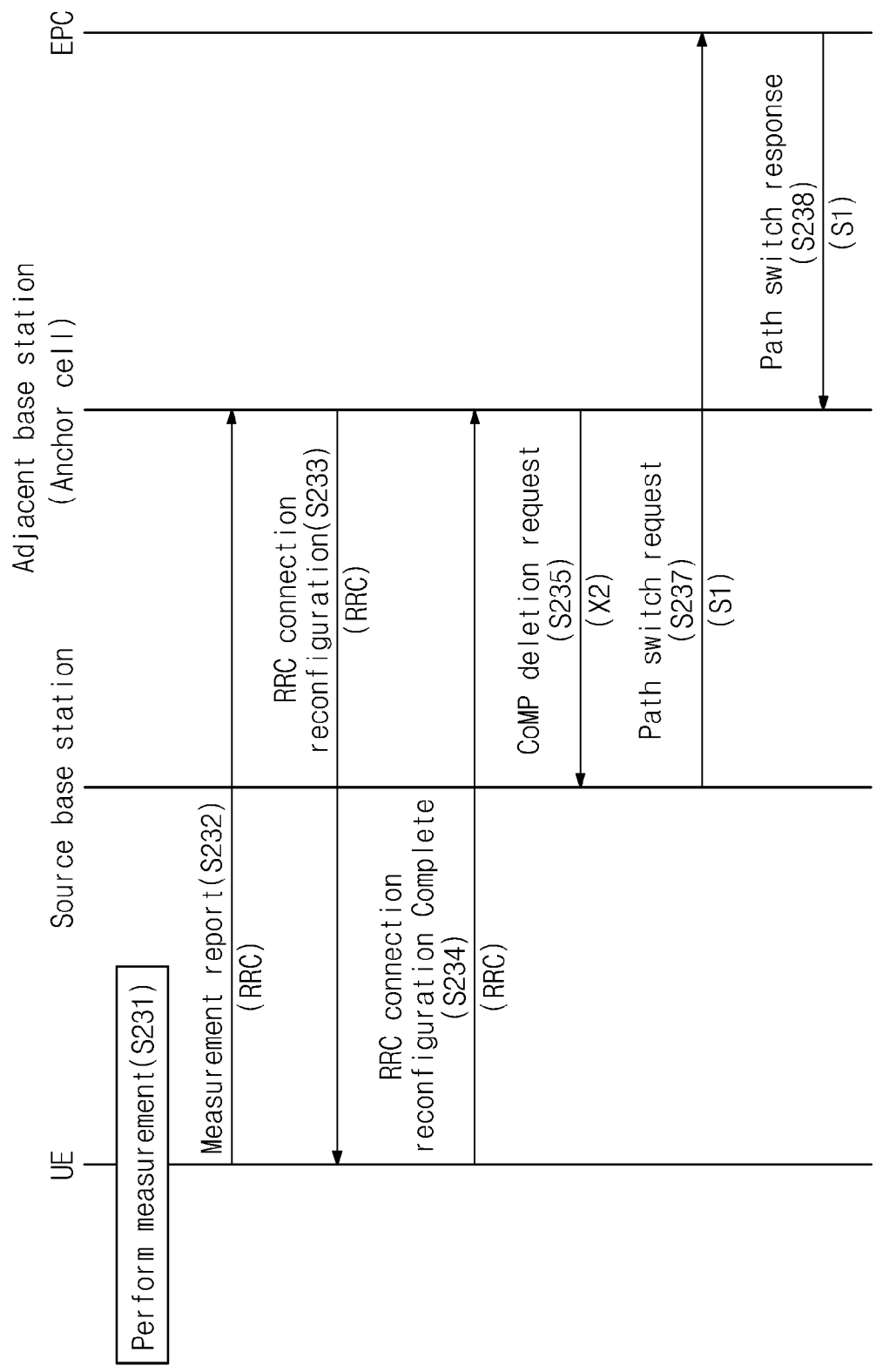
FIG. 19 is a flowchart illustrating an anchor cell deletion.
Figure 20A:
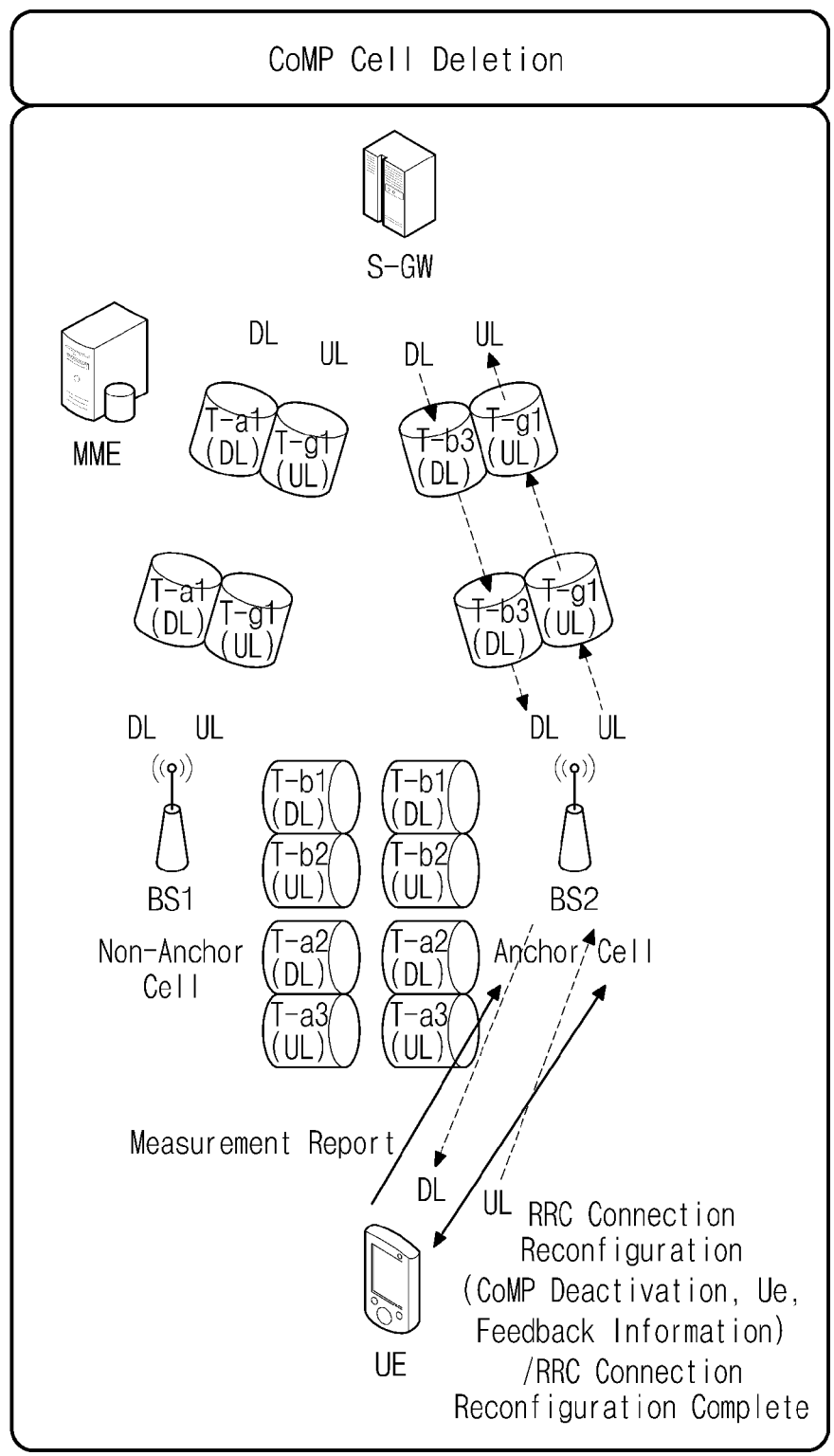
FIGS. 20A to 20C are views illustrating a packet flow according to an anchor cell deletion.
Figure 20B:
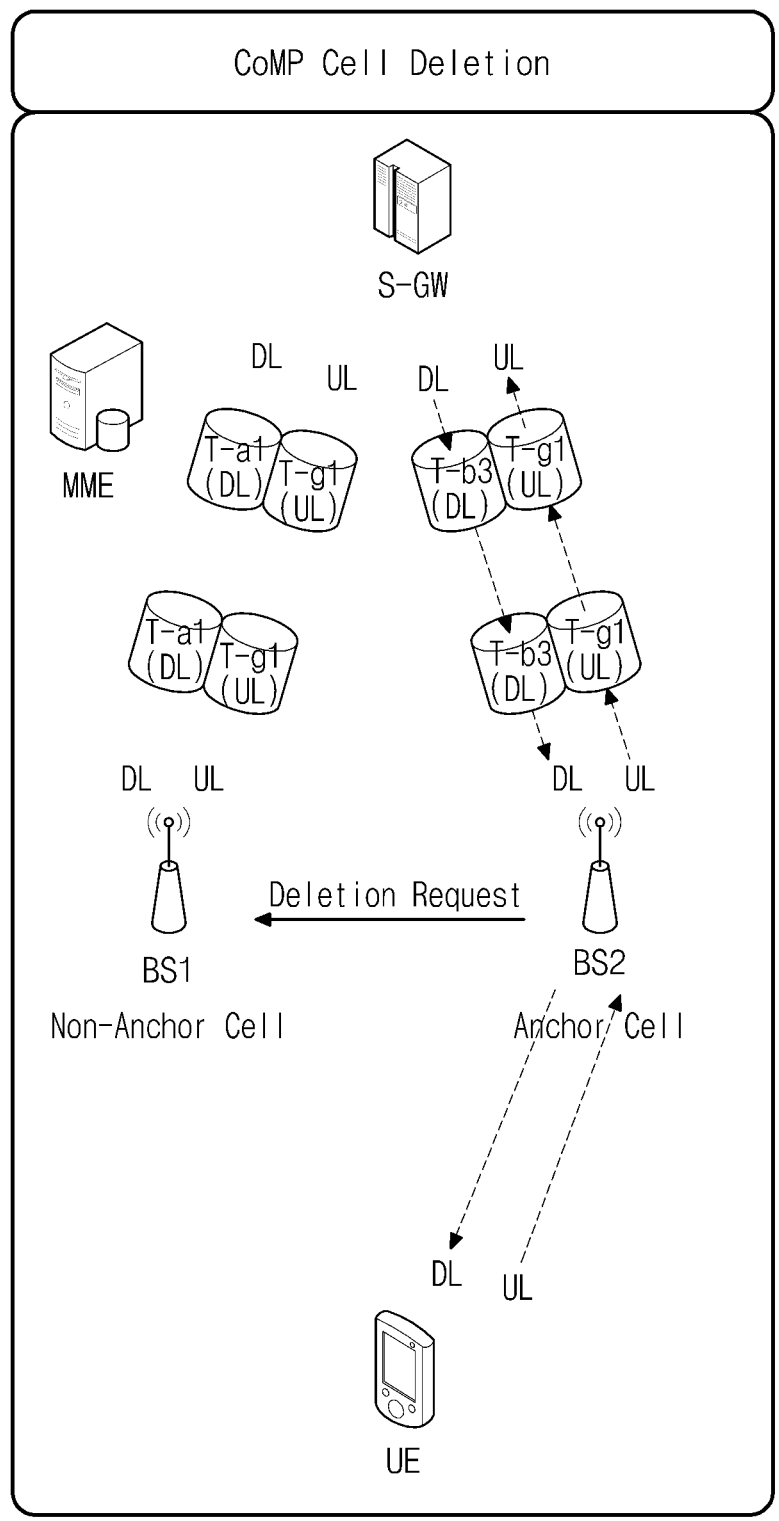
Figure 20C:
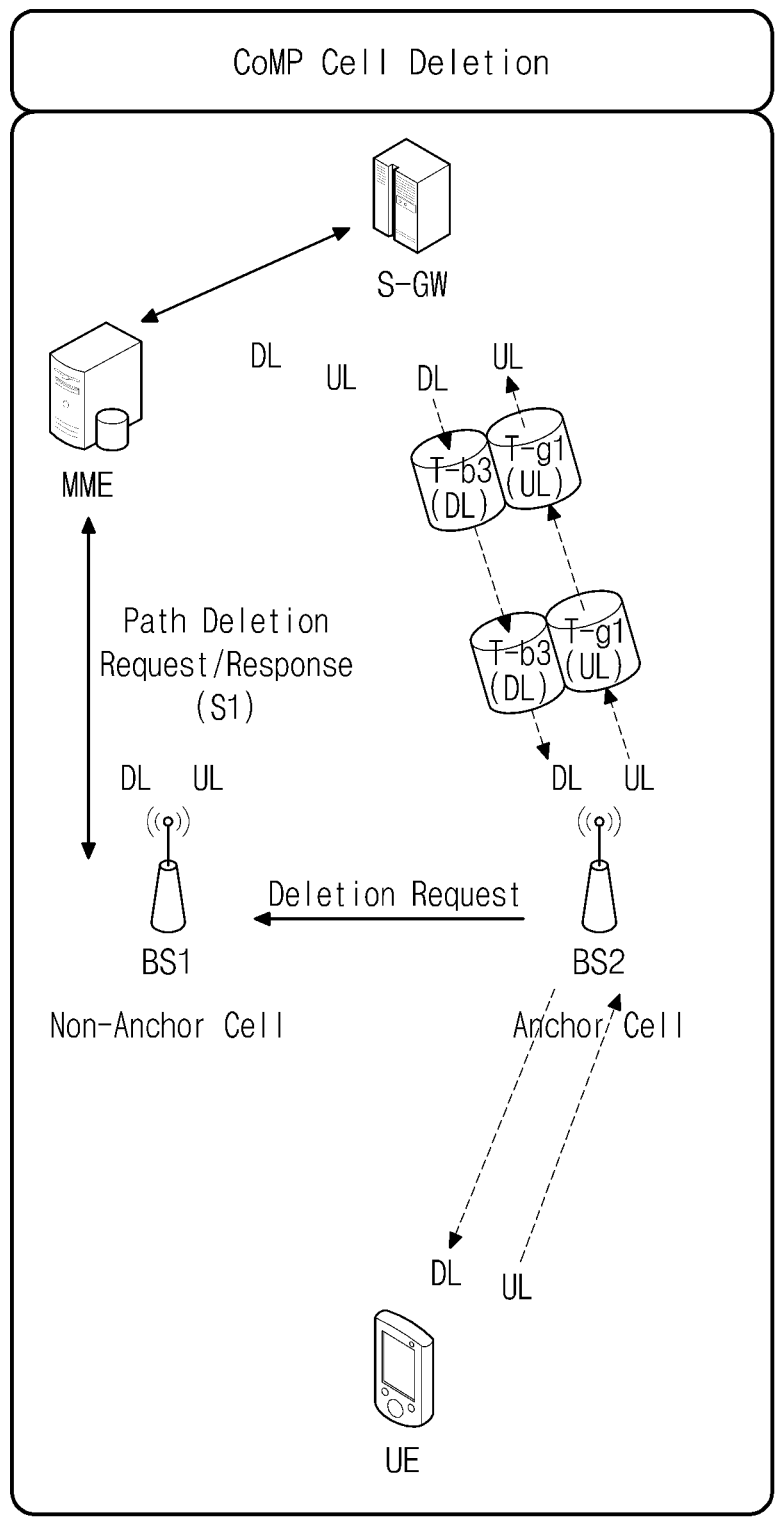

FIG. 19 is a flowchart illustrating an anchor cell deletion in operation S230. FIGS. 20A to 20C are views illustrating a packet flow according to an anchor cell deletion following to FIG. 18B. Referring to FIGS. 5, 19, and 20A to 20C, the UE performs a measurement operation in operation S231 and performs a measurement report operation in operation S232. For example, when the signal intensity of an adjacent BS becomes stronger than that of the source BS, the measurement report operation is performed. The measurement report operation may be performed when the signal intensity of the BS not the anchor cell becomes smaller than the first threshold value.

In operation S233, an RRC connection between the adjacent BS and the UE is reconfigured. In operation S234, the RRC connection reconfiguration is completed. At this point, the CoMP deactivation and feedback information of the UE may be transmitted to the UE.

In operation S235, the adjacent BS transmits a CoMP deletion request to the source BS. The source BS deletes all information related to the UE including CoMP (for example, T-b1, T-b2, T-a2, and T-a3)

In operation S237, the source BS transmits a path switch request to the EPC. In operation S238, the EPC transmits a path switch response to the source BS. All UL and DL access information such as T-a1 and Tg1 of the source BS and the S-GW is deleted.

In the CoMP cell deletion operation, the anchor cell transmits a CoMP deletion request message to the source BS. The source BS receiving the message stops its CoMP transmission/reception operation. Such a message may be delivered to another non-anchor cell to notify that the number of CoMP cells is changed into two if it occurs when the number of CoMP cells is three. Path information for multicasting is deleted through operations S237 and S238. The anchor cell finally notifies the UE that one non-anchor cell is deleted through operations S233 and S234.

Referring to FIGS. 14 to 20C, the UE exchanges an RRC connection reconfiguration and a reconfiguration complete message with the BS through an RRC interface. This message includes a CoMP cell list. The CoMP cell list includes cell information, information on an anchor cell or a non-anchor cell, operation information such as addition, optimization, and deletion, and feedback information such as CQI, PMO, and RI. The cell information includes information on a CoMP cell (which is added through signaling with respect to information on a handover cell provided during typical handover) and a feedback type of the UE. In the CoMP cell addition operation, information on a cell added as a CoMP cell, information indicating a non-anchor cell, and information on an add operation are transmitted. In the anchor cell switch operation, cell information on an anchor cell that is to be changed, information indicating an anchor cell, and information on a modify operation are transmitted. At this point, cell information corresponding to only the necessary information, which is used for distinguishing a corresponding cell, may be provided. In the CoMP cell deletion operation, information on a cell that is to be deleted, information indicating a non-anchor cell, and information on a delete operation are transmitted.

The source BS and the adjacent BS exchange a message through the X2 interface. In relation to the anchor cell addition request/response message, anchor cell information is provided to a non-anchor cell that is to be added in order to perform an operation on a CoMP cell that is to be added, and information on a non-anchor cell that is to be added is provided to the anchor cell. The anchor cell switch request/response message is to change an anchor cell, and includes information for notifying which anchor cell is to be switched and information on whether a cell receiving the message accepts the anchor cell switch. The CoMP cell deletion request message is to stop the CoMP transmission/reception operation of a non-anchor cell. Thus, a UE context release or a new message (for example, a CoMP delete request) may be designed. In order to use an existing message, a CoMP cell identifier may be added. If there is no CoMP cell identifier, the existing message is processed according to its meaning. Accordingly, if there is a CoMP cell identifier, a BS confirms whether the CoMP cell identifier indicates a cell that the BS manages and then stops the CoMP operation. If the BS has no relationship with a cell that the CoMP cell identifier indicates, it updates information that the corresponding CoMP cell is excluded from the CoMP operation.

The BS exchanges a message with the EPC through the S1 interface. The path addition request/response message may exchange a TE ID and a transport layer address for packets that are transmitted and received between the S-GW and the BS. The path switch request/response message notifies information that a BS is changed into another node in a control plane configuration between the MME and the BS, and links the newly changed BS with the MME. The path deletion request/response message may delete the S-GW corresponding to a cell deleted from the CoMP, and a TE-ID and a transport layer address related to a user plane. During the traffic packet change of a user plane between the S-GW and the BS, a multicast protocol may be internally used to exchange related information.

Once the CS/CB communication is performed according to the method of FIGS. 14 to 20C, the CoMP communication may be performed through a coordination between CoMP cells, and necessary information is added to existing load information for use. Moreover, an anchor cell may be changed according to an anchor cell switch operation, and the anchor cell switch operation may be performed by using a typical handover procedure.

Once the DPS communication is performed according to the method of FIGS. 14 to 20C, the CoMP communication is performed through an anchor cell switch request/response message and an RRC connection reconfiguration message.

Once the JT/JR communication is performed according to the method of FIGS. 14 to 20C, additional information exchange may be required. Therefore, the JT/JR communication is provided through a semi-static coordination method.

That is, one UE has bearers and the maximum transfer rate may be set enough in consideration of the bearers. Moreover, a UL and DL Hybrid Automatic Retransmit request (HARQ) is performed at the anchor cell side as a rule. When a current serving cell becomes an anchor cell by adding a CoMP cell, the anchor cell provides assignment pattern and frequency information of a sub frame for a predetermined time, and provides an activation time (for example, a SFN). For example, even if a CoMP cell is actually added, the CoMP transmission/reception of a non-anchor cell starts at the activation time.

The activation time refers to a SFN at which a CoMP transmission/reception starts in a non-anchor cell on the basis of an anchor cell. The sub frame pattern refers to a time bit map for a predetermined time. For example, when a sub frame is 100 ms and a specific bit in 100 maps is 1, a resource is allocated to the sub frame, and if the specific bit is 0, it is not. A reference point is the activation time, and is repeated. A frequency band represents a system band as a bit map on a frequency axis. If the bit value is 1, a resource is allocated to the frequency and if the bit value is 0, it is not. As another example, a frequency band may refer to a frequency hopping pattern map.

This information may be included in a CoMP cell addition request and a CoMP cell switch request. A CoMP optimization request/response message of the UE, which is transmitted from an anchor cell to another cell, is defined according to a change of the QoS of the UE so that a common allocation region for JT/JR may be defined in a CoMP cell. As a result, JT/JR is implemented but not in real time by providing a time point of the cell at which the CoMP is performed identically through the activation time.

By using such information, Physical Downlink Shared Channel (PDSCH) and Physical Uplink Shared Channel (PUSCH) resource areas for CoMP JT and CoMP JR are identically set between CoMP cells. If a resource is excessive for a transfer packet, a packet is padded and then transmitted.

Then, DL HARQ and UL HARQ are performed only by an anchor cell, and a non-anchor cell deactivates a HARQ function. The UL and DL resource allocation of HARQ is transmitted only in a not defined resource region. That is, all CoMP cells perform initial transmission by allocating a resource in a region defined by the above information, and the anchor cell performs retransmission according to ACK and NACK for the HARQ. A non-anchor deactivates a HARQ function.

Figure 21:
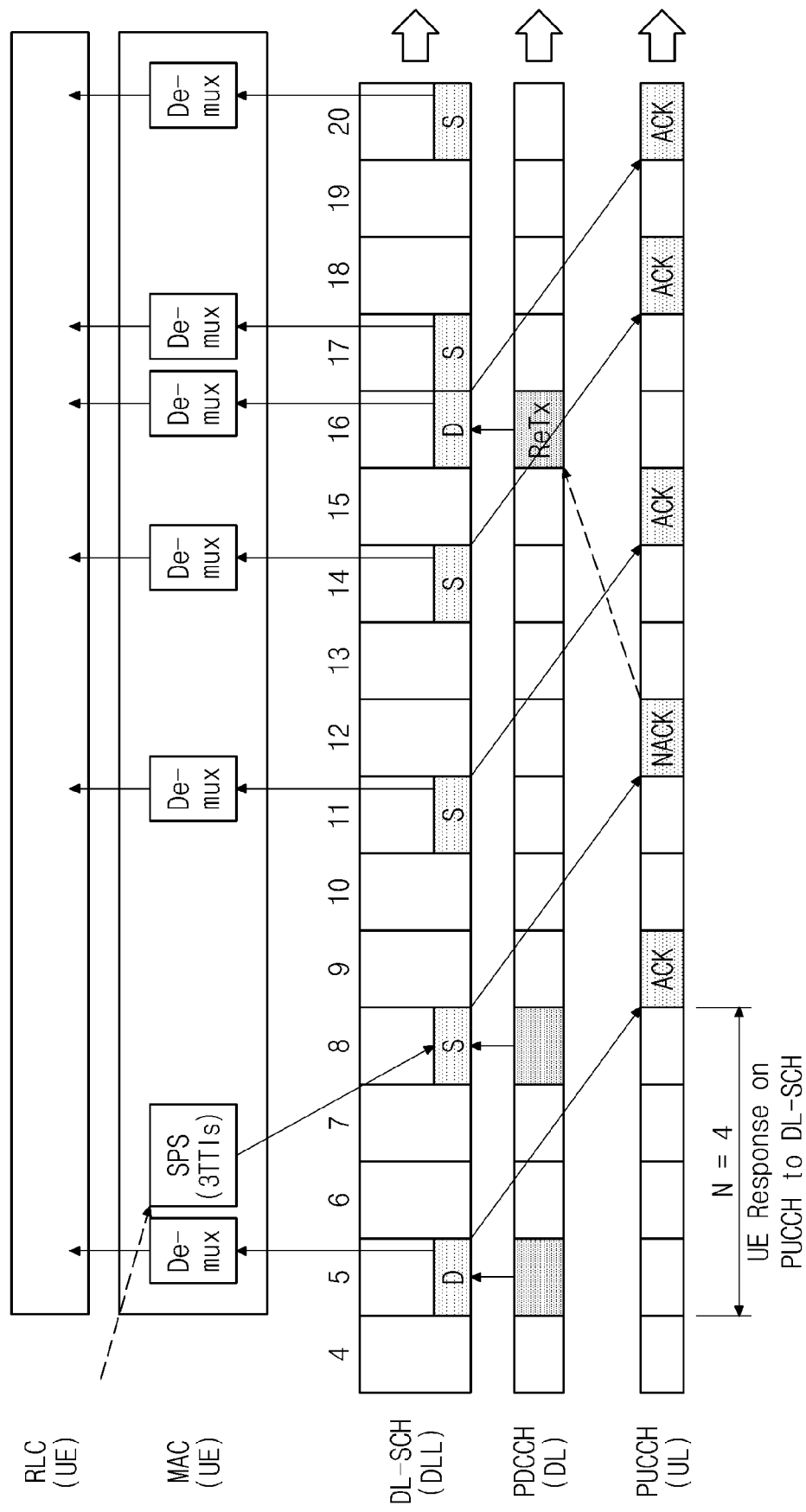
FIG. 21 is a view illustrating DL NACK processing.

When NACK for HARQ occurs, it is processed according to DL and UL. FIG. 21 is a view when DL NACK is processed. Referring to FIG. 21, a BS signals a DL assignment to a Physical Downlink Control Channel (PDCCH) in order to transmit DL data. Or, a BS simultaneously signals a DL assignment to the PDCCH of all cells including an anchor cell in a CoMP set or some cells.

The UE synchronously transmits data D or semi-static data S on the DL-SCH of the same TTI that the DL assignment of the PDCCH signals. If the CRC about the received data D or semi static data S is successful, the UE transmits ACK, and if it is unsuccessful, transmits NACK through the PUCCH. At this point, ACK/NACK is transmitted to an anchor cell through the assigned PUCCH. Or, ACK/NACK is simultaneously transmitted through the PUCCH of all cells including an anchor cell in a CoMP set or some cells. The BS signals a DL assignment (i.e., retransmission) with respect to the semi-static data S having NACK received through an anchor PUCCH to a slot 16 through the PDCCH after 4 TTI, and transmits the semi-static data S that are not transmitted to a slot 8 to the slot 16 of DL-SCH. Or, after collecting all PUCCH information on all CoMP sets, if there is at least one ACK, the BS may omit the retransmission.

Figure 22:
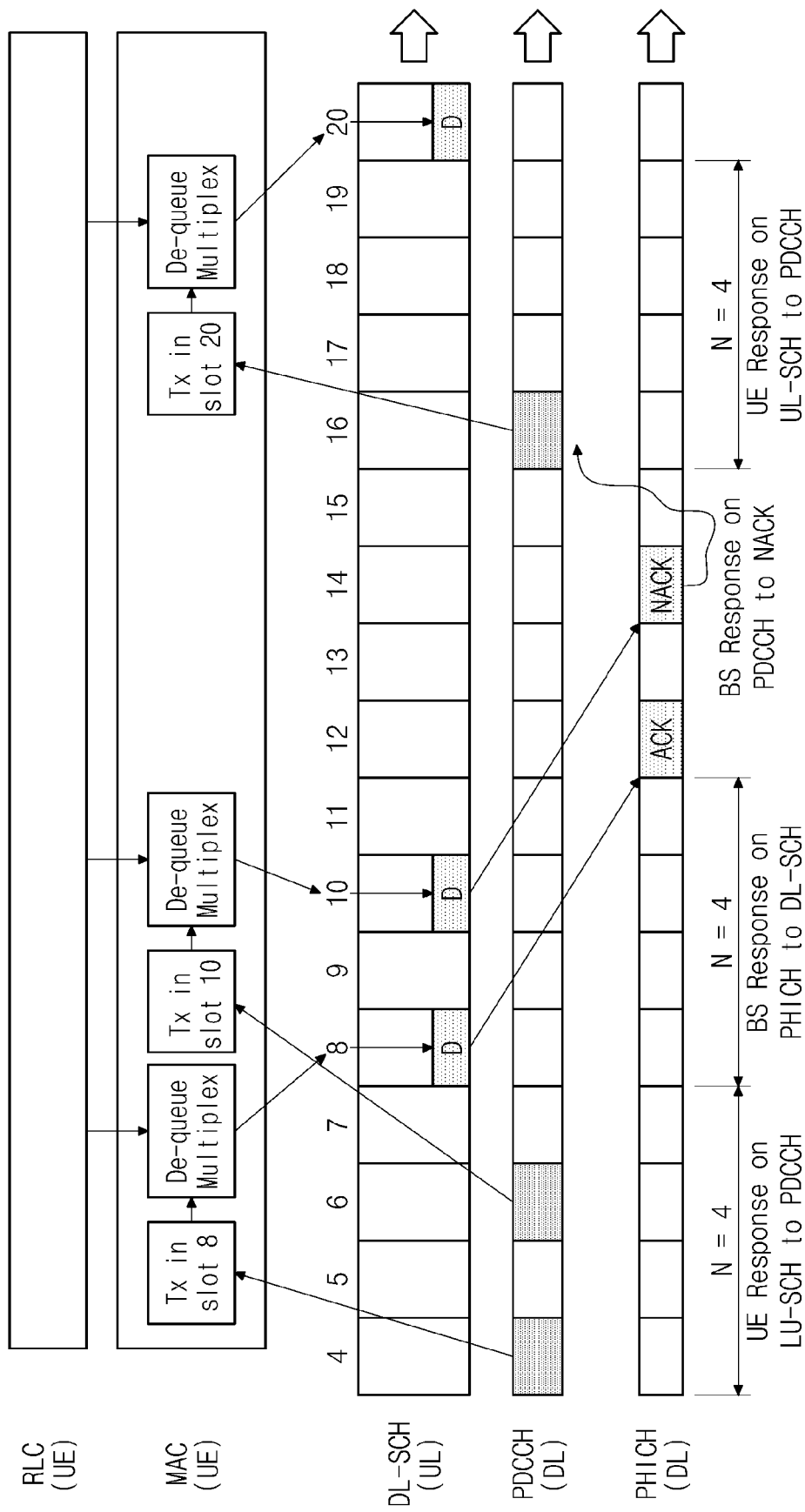
FIG. 22 is a view illustrating ULNACK processing.

FIG. 22 is a view when UL NACK is processed. Referring to FIG. 22, a BS scheduler signals a UL assignment to the PDCCH in order to deliver UL data. After signaling the PDCCH UL assignment, the UE transmits data D to a UL-SCH after 4 TTI. The BS receives the UL-SCH data D through software synchronization in all the CoMP sets or some cells. The BS provides ACK/NACK information on the received data D to the UE through an anchor PHICH. At this point, PHICK ACK/NACK information may be simultaneously provided to all or some cells of the CoMP set. If the CRC of the UL-SCH data D is failed, after providing NACK information, the BS may signal a UL assignment to the PDCCH in order to again receive the data D having NACK via an anchor PDCCH. Or an UL assignment is signaled to the PDCCH of all cells including an anchor cell or some cells of the CoMP set.

In the case of communication between BSs, as shown in FIG. 22, the HARQ may consider a process for PUCCH or PHICH in correspondence to an anchor cell change timing (i.e., an activation time). For example, if an anchor cell is changed according to an activation time between sub frames 12 and 13, a PDCCH DL assignment corresponding to retransmission may be signaled in a changed anchor cell. However, this may further maintain the storing of the NACK semi-static data S of the slot 8, including an anchor cell change time of a terminal. In the case of the CoMP, a PDCCH DL assignment for PUCCH NACK may be negotiated with 4TTI+alpha not 4TTI, and may be dynamically set through RRC-RRC signaling or MAC-MAC signaling.

Referring to FIG. 22, if an anchor cell change time is 13 or 14, a NACK process for PHICH may be performed by a changed anchor cell, or a previous anchor cell. In the case of CoMP NACK, the UL assignment may be fixed with 4TTI+ alpha, which is somewhat greater than 4TTI, after transmitting NACK as data D through UL-DSH. This may be dynamically set through a wireless interface procedure or a MAC- MAC procedure. As another example, after the activation time, a PUCCH and PHICH process is allowed for some TTI and the remaining process may be implemented by RLC transmission mechanism.

According to the present invention, provided is a method of managing mobility having CoMP communication applied, in more detail, a handover method.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing mobility of a user equipment, the method comprising:
    establishing by a first base station a communication between a controller and the user equipment;
    transmitting by the first base station a Coordinated Multiple Point (CoMP) addition request to a second base station;
    establishing by the first and second base stations a CoMP communication between the controller and the user equipment according to the CoMP addition request;
    transmitting by the first base station an anchor cell switch request to the second base station; and
    operating the second base station as an anchor cell of the CoMP communication according to the anchor cell switch request,
    wherein the first base station is configured to control a plurality of communication points, communicate with the user equipment through two or more communication points when a coordinated communication within a base station is established, and communicate with the user equipment through a communication point when the coordinated communication with the base station is not established,
    wherein the second base station is configured to transmit a path addition request to the controller in response to the CoMP addition request,
    wherein the second base station is configured to transmit a path switch request to the controller in response to the anchor cell switch request.

2. The method of claim 1, wherein the anchor cell switch request is transmitted through a sidehaul or backhaul communication.

3. The method of claim 1, wherein the CoMP addition request is transmitted through a sidehaul or backhaul communication.

4. The method of claim 1, wherein the CoMP addition request comprises information on an activation time that the second base station starts the CoMP communication to the user equipment.

5. The method of claim 4, wherein the second base station starts the CoMP communication to the user equipment at the activation time.

6. The method of claim 1, wherein the path addition request requests to add the second base station to a data transmission path between the controller and the user equipment in addition to the first base station.

7. The method of claim 1, wherein the first base station forwards downlink data that are to be transmitted to the user equipment to the second base station.

8. The method of claim 1, wherein when the first and second base stations provide the CoMP communication to the user equipment, retransmitting error data is performed only by an anchor cell.

9. The method of claim 1, wherein the path switch request requests to switch a main data transmission path between the controller and the user equipment to the second base station from the first base station.

10. The method of claim 1, further comprising:
    transmitting, by the second base station, a CoMP communication deletion request to the first base station; and
    disconnecting with the user equipment, by the first base station, in response to the CoMP communication deletion request.

11. The method of claim 10, further comprising requesting, by the first base station, to the controller to delete the first station from a data transmission path between the controller and the user equipment.

12. The method of claim 1, wherein the anchor cell switch request is transmitted to the second base station according to signal intensities of the first and second base stations.

13. The method of claim 1, wherein when a third base station is added to the CoMP communication, the anchor cell notifies the user equipment and the first base station that a third base station is added, and transmits information on the first and second base stations to the third base station.

14. The method of claim 13, wherein the anchor cell transmits information on which cell is an anchor cell to the third base station.

15. The method of claim 1, wherein the transmitting the CoMP addition request is performed when signal power from the first base station to the user equipment is smaller than a threshold value.

16. The method of claim 1, wherein the transmitting the CoMP addition request is performed when signal power from the second base station to the user equipment is higher than a threshold value.

* * * * *